(12) United States Patent
Chmil et al.

(10) Patent No.: US 11,126,621 B1
(45) Date of Patent: *Sep. 21, 2021

(54) DATABASE METHODOLOGY FOR SEARCHING ENCRYPTED DATA RECORDS

(71) Applicant: Allscripts Software, LLC, Raleigh, NC (US)

(72) Inventors: Igor Chmil, Buffalo Grove, IL (US); Mark Gregory Plunkett, Libertyville, IL (US); Stanislav Makarskyy, Arlington Heights, IL (US)

(73) Assignee: ALLSCRIPTS SOFTWARE, LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,635

(22) Filed: Jan. 6, 2020

Related U.S. Application Data

(63) Continuation of application No. 15/859,584, filed on Dec. 31, 2017, now Pat. No. 10,528,556.

(51) Int. Cl.
*G06F 16/245* (2019.01)
*G06F 16/901* (2019.01)
(Continued)

(52) U.S. Cl.
CPC .......... *G06F 16/245* (2019.01); *G06F 16/221* (2019.01); *G06F 16/2282* (2019.01);
(Continued)

(58) Field of Classification Search
CPC ............... H04L 9/3213; G06F 16/9017; G06F 16/90344; G06F 21/602; G06F 16/245; G06F 16/221; G06F 16/2282
(Continued)

(56) References Cited

U.S. PATENT DOCUMENTS 5,001,477 A    3/1991   Hicks et al.
5,274,805 A   12/1993   Ferguson et al.
(Continued)

OTHER PUBLICATIONS

"Preliminary Amendment for U.S. Appl. No. 15/859,584", filed Mar. 26, 2018, 8 pages.
(Continued)

*Primary Examiner* — Shahriar Zarrineh
(74) *Attorney, Agent, or Firm* — Medley, Behrens & Lewis, LLC

(57) ABSTRACT

A method for increasing sargability of encrypted records to allow for searching of a first column of a first data table for encrypted values containing a search string without having to decrypt all encrypted values involves, for each respective data record in the first data table, accessing an encrypted data value from the first column, decrypting the accessed encrypted data value, generating from the decrypted data value a respective plurality of substrings of various lengths, encrypting each substring of the respective plurality of substrings as an encrypted substring token, and storing each encrypted substring token in association with a reference value for lookup of a corresponding record in the first data table. Subsequently, the first column of the first data table can be searched for encrypted values containing a first search string by encrypting the first search string and searching for encrypted substring tokens matching the encrypted first search string.

16 Claims, 41 Drawing Sheets

(51) Int. Cl.
*G06F 16/903* (2019.01)
*G06F 16/22* (2019.01)
*G06F 21/60* (2013.01)
*H04L 9/32* (2006.01)

(52) U.S. Cl.
CPC .... *G06F 16/9017* (2019.01); *G06F 16/90344* (2019.01); *G06F 21/602* (2013.01); *H04L 9/3213* (2013.01)

(58) Field of Classification Search
USPC .......................................................... 713/185
See application file for complete search history.

(56) References Cited

U.S. PATENT DOCUMENTS

| | | | |
|---|---|---|---|
| 5,367,675 A | 11/1994 | Cheng et al. | |
| 5,377,349 A * | 12/1994 | Motomura | G06F 7/02 712/17 |
| 5,452,451 A * | 9/1995 | Akizawa | G06F 16/90344 |
| 5,499,358 A | 3/1996 | Nevarez | |
| 5,737,733 A * | 4/1998 | Eller | H03M 7/30 707/708 |
| 5,778,371 A * | 7/1998 | Fujihara | G06F 16/90344 |
| 5,855,013 A | 12/1998 | Fisk | |
| 5,930,795 A | 7/1999 | Chen et al. | |
| 5,963,666 A | 10/1999 | Fujisaki et al. | |
| 5,963,942 A * | 10/1999 | Igata | G06F 16/90344 |
| 5,992,737 A * | 11/1999 | Kubota | G06F 16/90344 235/380 |
| 6,167,400 A * | 12/2000 | Brandin | G06F 16/90344 707/758 |
| 6,614,789 B1 * | 9/2003 | Yazdani | H04L 45/00 370/392 |
| 7,251,665 B1 * | 7/2007 | Dunning | G06F 16/90344 |
| 7,890,774 B2 * | 2/2011 | Agrawal | G06F 21/6227 713/193 |
| 8,775,457 B2 * | 7/2014 | Schneider | G06F 16/90344 707/758 |
| 9,413,734 B1 | 8/2016 | Wong | |
| 9,613,292 B1 * | 4/2017 | El Defrawy | H04L 67/10 |
| 9,646,172 B1 | 5/2017 | Hahn et al. | |
| 9,800,558 B2 * | 10/2017 | Kerschbaum | G06F 16/23 |
| 9,977,805 B1 * | 5/2018 | Bowman | G06F 16/27 |
| 10,007,803 B2 | 6/2018 | Kaushik et al. | |
| 10,114,955 B2 | 10/2018 | Conway | |
| 10,242,230 B1 | 3/2019 | Kenthapadi et al. | |
| 10,268,839 B1 | 4/2019 | Kenthapadi et al. | |
| 10,360,372 B1 | 7/2019 | Kenthapadi et al. | |
| 10,528,556 B1 | 1/2020 | Chmil et al. | |
| 10,621,364 B1 * | 4/2020 | El Defrawy | H04L 9/008 |
| 10,936,744 B1 * | 3/2021 | Trepetin | H04L 63/0428 |
| 2002/0069193 A1 | 6/2002 | Beavin et al. | |
| 2003/0084038 A1 * | 5/2003 | Balogh | G06F 9/546 |
| 2003/0123671 A1 | 7/2003 | He et al. | |
| 2003/0158725 A1 * | 8/2003 | Woods | G06F 16/90344 704/10 |
| 2004/0015498 A1 * | 1/2004 | Rabaioli | G06F 16/90344 |
| 2004/0030677 A1 | 2/2004 | Young-Lai | |
| 2004/0243816 A1 | 12/2004 | Hacigumus et al. | |
| 2004/0267713 A1 * | 12/2004 | Chaudhuri | G06F 16/90344 |
| 2005/0203940 A1 | 9/2005 | Farrar et al. | |
| 2006/0041533 A1 | 2/2006 | Koyfman | |
| 2006/0179052 A1 * | 8/2006 | Pauws | G06F 16/90344 |
| 2008/0019510 A1 * | 1/2008 | Kerschbaum | H04L 9/008 380/30 |
| 2008/0082834 A1 | 4/2008 | Mattsson | |
| 2008/0133935 A1 | 6/2008 | Elovici et al. | |
| 2008/0183644 A1 | 7/2008 | Bruno et al. | |
| 2008/0183764 A1 | 7/2008 | Bruno et al. | |
| 2008/0317242 A1 | 12/2008 | Bohush et al. | |
| 2010/0125594 A1 * | 5/2010 | Li | G06F 16/90344 707/758 |
| 2010/0174728 A1 * | 7/2010 | Ding | G06F 40/12 707/758 |
| 2010/0228726 A1 | 9/2010 | Slinker et al. | |
| 2012/0233185 A1 * | 9/2012 | Najjar | G06F 16/90344 707/752 |
| 2013/0086391 A1 | 4/2013 | Kleiner et al. | |
| 2013/0179684 A1 | 7/2013 | Furukawa | |
| 2013/0191650 A1 | 7/2013 | Balakrishnan et al. | |
| 2013/0238646 A1 | 9/2013 | Maro | |
| 2013/0246813 A1 | 9/2013 | Mori et al. | |
| 2013/0297641 A1 * | 11/2013 | Shinjo | G06F 16/24 707/758 |
| 2014/0052999 A1 | 2/2014 | Aissi et al. | |
| 2014/0136840 A1 | 5/2014 | Spalka et al. | |
| 2014/0233727 A1 * | 8/2014 | Rohloff | G06F 16/3347 380/28 |
| 2014/0274928 A1 | 9/2014 | Dowling et al. | |
| 2014/0281589 A1 | 9/2014 | Bain | |
| 2014/0324963 A1 * | 10/2014 | Sankar | G06F 16/9574 709/204 |
| 2015/0039903 A1 | 2/2015 | Cash et al. | |
| 2015/0067123 A1 * | 3/2015 | Goyal | G06F 16/90344 709/223 |
| 2015/0089574 A1 | 3/2015 | Mattsson et al. | |
| 2015/0095664 A1 | 4/2015 | Furukawa | |
| 2015/0188890 A1 * | 7/2015 | Said | H04L 63/0428 713/168 |
| 2015/0317483 A1 | 11/2015 | Mori | |
| 2015/0363447 A1 | 12/2015 | Dickie | |
| 2015/0379299 A1 | 12/2015 | Klein et al. | |
| 2016/0132692 A1 | 5/2016 | Kerschbaum et al. | |
| 2016/0180097 A1 | 6/2016 | Estehghari et al. | |
| 2016/0232362 A1 | 8/2016 | Conway | |
| 2016/0283661 A1 | 9/2016 | Zwinger | |
| 2016/0292427 A1 | 10/2016 | Paya et al. | |
| 2016/0292430 A1 | 10/2016 | Antonopoulos et al. | |
| 2017/0011120 A1 * | 1/2017 | Cheung | G06F 16/325 |
| 2017/0078251 A1 * | 3/2017 | Grubbs | H04L 63/0471 |
| 2017/0110114 A1 * | 4/2017 | Edelson | G10L 15/187 |
| 2017/0262546 A1 | 9/2017 | Chen et al. | |
| 2017/0344646 A1 | 11/2017 | Antonopoulos et al. | |
| 2018/0123800 A1 | 5/2018 | Kim et al. | |
| 2018/0365290 A1 | 12/2018 | Kaushik et al. | |
| 2019/0018982 A1 | 1/2019 | Edgar | |
| 2019/0028273 A1 | 1/2019 | Harras | |
| 2019/0034646 A1 | 1/2019 | Fujiwara et al. | |
| 2019/0108255 A1 | 4/2019 | Tabak et al. | |
| 2019/0147078 A1 | 5/2019 | Dageville et al. | |
| 2019/0147172 A1 * | 5/2019 | Chen | G06F 21/6227 713/193 |
| 2019/0156051 A1 | 5/2019 | Beier et al. | |
| 2019/0158269 A1 | 5/2019 | Kesarwani et al. | |
| 2019/0220620 A1 * | 7/2019 | Hahn | H04L 9/008 |
| 2019/0384931 A1 * | 12/2019 | Lahav | G06F 21/602 |

OTHER PUBLICATIONS

"Terminal Disclaimer for U.S. Appl. No. 15/859,584", filed Aug. 14, 2019, 2 pages.

"Notice of Allowance and Fees Due for U.S. Appl. No. 15/859,584", dated Aug. 26, 2019, 18 pages.

\* cited by examiner

FRANK BLACK

Last Name ▸ | Doe | | Search

| | | |
|---|---|---|
| ☺ | Doe, Jim E.<br>Age: 31 \| Sex M | Room 148, Bed 2 |
| ☺ | Doer, Jean R.<br>Age: 64 \| Sex F | Room 353, Bed 1 |
| ☺ | Doers, Russell P.<br>Age: 38 \| Sex M | Room 452, Bed 2 |

▽ Frank Black's To Do List

▽ Take Blood Pressure

△ Call Ms. Floyd
Gertrude Floyd

FIG. 1

```
SELECT PatientGUID
FROM dbo.[patients] AS PE
WHERE PE.LastName LIKE 'Doe' + '%'
```

| Results | | | | | |
|---|---|---|---|---|---|
| PatientGUID | LastName | FirstName | MI | City | State |
| 9865412 | Doe | Jim | E | Cary | NC |
| 4521365 | Doer | Jean | R | Los Angeles | CA |
| 7897891 | Doers | Russell | P | Chicago | IL |

*FIG. 3*

Construct index sorted by LastName value.

| LastName | FirstName | PatientGUID |
|---|---|---|
| Adams | John | 6541235 |
| Dodd | Sue | 9871544 |
| Doe | Jim | 9865412 |
| Doer | Jean | 4521365 |
| Doers | Russell | 7897891 |
| Doff | Bill | 9256145 |
| Zown | James | 4582354 |

*FIG. 4*

Index Scan Required – e.g. can't construct index sorted by decrypted last name values without decrypting every record.

| LastName_enc | FirstName_enc | PatientGUID |
|---|---|---|
| 2384dfqw | xy763er9 | 1112116 |
| o3j5f900 | 4er9zx10 | 4521365 |
| fd93j8r5 | ae74fr93 | 7897891 |
| 349rft74 | 7643dfer | 9865412 |
| ad39bb28 | 9876rtyu | 9995423 |

*FIG. 10*

SELECT PatientGUID
FROM dbo.[patients] AS PE
WHERE CONVERT (VARCHAR(60), DECRYPTBYKEY(PE.LastName)) LIKE 'Doe' + '%'

Results

| | PatientGUID | LastName_enc | FirstName_enc | City | State |
|---|---|---|---|---|---|
| Jim Doe | 9865412 | 349rff74 | 7643dfer | Cary | NC |
| Jean Doer | 4521365 | o3j5f900 | 4er9zx10 | Los Angeles | CA |
| Russell Doers | 7897891 | fd93j8r5 | ae74fr93 | Chicago | IL |

*FIG. 11*

```
public class subItem
{
    public string token;
    public int seed;

public subItem(int aSeed, string aToken)
    {
        seed = aSeed;
        token = aToken;
    }
} public static class generator
{
    public static List<subItem> generateStartsWith(theString, minSubstringLength)
    {
        List<subItem> ret = new List<subItem>;
        int seedMax = theString.length() - minSubstringLength;
        for(int i=0; i<=seedMax; i++)
        {
            ret.Add(new subItem(i, theString.substring(0,theString.length()-i)));
        }
        return ret;
    }
}
```

*FIG. 13*

Construct index sorted by Token_enc value.

| Token_enc | ID | PatientGUID | Seed |
|---|---|---|---|
| 349rft74 | 1246749846 | 4521365 | 1 |
| 349rft74 | 1246765449 | 7897891 | 2 |
| 349rft74 | 1246786145 | 9865412 | 0 |
| 8214cvr1 | 1246749847 | 4521365 | 2 |
| 8214cvr1 | 1246765450 | 7897891 | 3 |
| 8214cvr1 | 1246786146 | 9865412 | 1 |
| fd93j8r5 | 1246765447 | 7897891 | 0 |
| o3j5f9oo | 1246749845 | 4521365 | 0 |
| o3j5f9oo | 1246765448 | 7897891 | 1 |

FIG. 18

'Doe' ⟶ 349rft74

| Token_enc | ID | PatientGUID | Seed |
|---|---|---|---|
| 349rft74 | 1246749846 | 4521365 | 1 |
| 349rft74 | 1246765449 | 7897891 | 2 |
| 349rft74 | 1246786145 | 9865412 | 0 |
| 8214cvr1 | 1246749847 | 4521365 | 2 |
| 8214cvr1 | 1246765450 | 7897891 | 3 |
| 8214cvr1 | 1246786146 | 9865412 | 1 |
| fd9j8r5 | 1246765447 | 7897891 | 0 |
| o3j5f900 | 1246749845 | 4521365 | 0 |
| o3j5f900 | 1246765448 | 7897891 | 1 |

Return results based on ID or PatientGUID values.

*FIG. 21*

| | Results | | | |
|---|---|---|---|---|
| PatientGUID | LastName_enc | FirstName_enc | City | State |
| 4521365 | o3j5f900 | 4er9zx10 | Los Angeles | CA |
| 7897891 | fd93j8r5 | ae74fr93 | Chicago | IL |
| 9865412 | 349rft74 | 7643dfer | Cary | NC |

Jean Doer
Russell Doers
Jim Doe

*FIG. 22*

| | Results | | | |
|---|---|---|---|---|
| PatientGUID | LastName | FirstName | City | State |
| 4521365 | Doer | Jean | Los Angeles | CA |
| 7897891 | Doers | Russell | Chicago | IL |
| 9865412 | Doe | Jim | Cary | NC |

Jean Doer
Russell Doers
Jim Doe

*FIG. 23*

SQLQuery1.sql

```
DECLARE @MyPatID UNIQUEIDENTIFIER
SET @MyPatID = (SELECT TOP 1 PatientGUID FROM Patients ORDER BY NEWID())

SELECT
    PatientGUID,
    LastName
FROM Patients
WHERE PatientGUID = @MyPatID
```

Results | Messages

| | PatientGUID | LastName |
|---|---|---|
| 1 | 7000F552-4A98-4B08-AB6B-FE601FE44D55 | patdemolnk82 |

*FIG. 25*

SQLQuery1.sql

DECLARE @MyPatID UNIQUEIDENTIFIER
SET @MyPatID = (SELECT TOP 1 PatientGUID FROM Patients ORDER BY NEWID())

SELECT *
FROM [dbo].[Patients_enc_nondet]
WHERE [PatientGUID] = @MyPatID

Results | Messages

| | PatientGUID | LastName_enc |
|---|---|---|
| 1 | 7000F552-4A98-4B08-AB6B-FE601FE44D55 | 0x00CA7D2C4D2A814D8833DB586E65FFC8010000005AD886... |

*FIG. 26*

```
CREATE FUNCTION [dbo].[ParseStringForLikeSearch]
(
    @MyWord VARCHAR(500)
)
RETURNS @MyTokens TABLE
(
    Seed SMALLINT NOT NULL PRIMARY KEY,
    Token VARCHAR(500)
)
AS
BEGIN
    DECLARE @Len SMALLINT
    DECLARE @CurrLen SMALLINT = 3

SET @Len = LEN(@MyWord)
    SET @CurrLen = @Len

WHILE @CurrLen > 1
    BEGIN
        INSERT @MyTokens
        (
            Seed,
            Token
        )
        VALUES
        (
            ABS(@CurrLen - @Len),
            LEFT(@MyWord, @CurrLen)
        )
        SET @CurrLen = -1
    END
    RETURN
END
```

*FIG. 28*

```
SQLQuery1.sql    x

DECLARE @MyPatID UNIQUEIDENTIFIER
SET @MyPatID = (SELECT TOP 1 PatientGUID FROM Patients ORDER BY NEWID())

SELECT *
FROM [dbo].[PatientsLN_cat_enc_det]
WHERE [PatientGUID] = @MyPatID
```

Results | Messages

| | ID | PatientGUID | Token | Seed |
|---|---|---|---|---|
| 1 | 6463772 | 7000F552-4A98-4B08-AB6B-FE601FE44D55 | 0x01FE7454C87F9D707F01C304946D58939F3065B2CDD1B9E... | 0 |
| 2 | 6463773 | 7000F552-4A98-4B08-AB6B-FE601FE44D55 | 0x01C63865 7CF4E1AACFE8E762FC972FEEE483549E64AD2CB... | 1 |
| 3 | 6463774 | 7000F552-4A98-4B08-AB6B-FE601FE44D55 | 0x0159BB618C4822F20F350137AAAB52861FC5AA5F77446D3F... | 2 |
| 4 | 6463775 | 7000F552-4A98-4B08-AB6B-FE601FE44D55 | 0x017E27DB744FC8D16DA4381D112CB3FE67E790BC9C77E9... | 3 |
| 5 | 6463776 | 7000F552-4A98-4B08-AB6B-FE601FE44D55 | 0x01DA2030ADDEB44432D571230341 6C0FCF94B1FF227145C... | 4 |
| 6 | 6463777 | 7000F552-4A98-4B08-AB6B-FE601FE44D55 | 0x01CE111A57FFA88C61F0A16214DA1CAF9F5153E150AA144... | 5 |
| 7 | 6463778 | 7000F552-4A98-4B08-AB6B-FE601FE44D55 | 0x01997C98C99E40DA66FB01C9418FFFC59C962E2CA9D5F58... | 6 |
| 8 | 6463779 | 7000F552-4A98-4B08-AB6B-FE601FE44D55 | 0x01FE7454C87F9D707F01C304946D58939F3065B2CDD1B9E... | 7 |
| 9 | 6463780 | 7000F552-4A98-4B08-AB6B-FE601FE44D55 | 0x014F4EE3811E482798F79777F9E5D4FB2F11D2813DCF08A... | 8 |
| 10 | 6463781 | 7000F552-4A98-4B08-AB6B-FE601FE44D55 | 0x019488CA204FDA95C3BB4803AE11C3D54F6C730BF2415C3... | 9 |
| 11 | 6463782 | 7000F552-4A98-4B08-AB6B-FE601FE44D55 | 0x01633B4F98BCD8D3B9BE6CEB9965D674F335E8D235BA8C... | 10 |

FIG. 29

```
SQLQuery1.sql    ×

DECLARE @MyPatID UNIQUEIDENTIFIER = '7000F552-4A98-4B08-AB6B-FE601FE44D55'

SELECT *
FROM [dbo].[PatientsLN_cat_enc_det]
WHERE [PatientGUID] = @MyPatID
```

| | ID | PatientGUID | Token | Seed |
|---|---|---|---|---|
| 1 | 6463772 | 7000F552-4A98-4B08-AB6B-FE601FE44D55 | patdemolnk82 | 0 |
| 2 | 6463773 | 7000F552-4A98-4B08-AB6B-FE601FE44D55 | patdemolnk8 | 1 |
| 3 | 6463774 | 7000F552-4A98-4B08-AB6B-FE601FE44D55 | patdemolnk | 2 |
| 4 | 6463775 | 7000F552-4A98-4B08-AB6B-FE601FE44D55 | patdemoln | 3 |
| 5 | 6463776 | 7000F552-4A98-4B08-AB6B-FE601FE44D55 | patdemol | 4 |
| 6 | 6463777 | 7000F552-4A98-4B08-AB6B-FE601FE44D55 | patdemo | 5 |
| 7 | 6463778 | 7000F552-4A98-4B08-AB6B-FE601FE44D55 | patdem | 6 |
| 8 | 6463779 | 7000F552-4A98-4B08-AB6B-FE601FE44D55 | patde | 7 |
| 9 | 6463780 | 7000F552-4A98-4B08-AB6B-FE601FE44D55 | patd | 8 |
| 10 | 6463781 | 7000F552-4A98-4B08-AB6B-FE601FE44D55 | pat | 9 |
| 11 | 6463782 | 7000F552-4A98-4B08-AB6B-FE601FE44D55 | pa | 10 |

FIG. 30

SQLQuery1.sql

SELECT COUNT(DISTINCT PatientGUID) FROM [dbo].[Patients_enc_nondet]

SELECT COUNT(DISTINCT PatientGUID) FROM [dbo].[PatientsLN_cat_enc_det]

Results | Messages

| | No Column Name |
|---|---|
| 1 | 1070928 |

| | No Column Name |
|---|---|
| 1 | 1070928 |

*FIG. 31*

SQLQuery1.sql   ×

```
--Scan
DECLARE @MyName VARCHAR(60) = 'patb'

OPEN SYMMETRIC KEY SymmetricKey1
DECRYPTION BY CERTIFICATE ErxDBCert;

SELECT
    PatientGUID
FROM [dbo].[Patients_enc_nondet] AS PE
WHERE    CONVERT (VARCHAR (60), DECRYPTBYKEY(PE.LastName_enc)) LIKE @MyName + '%'
ORDER BY 1;

CLOSE SYMMETRIC KEY SymmetricKey1;
GO
```

Results | Messages | Execution Statistics

Query returned: 333 matches

| Table | Scan Count | Logical Reads | Physical Reads | Read-Ahead Reads | LOB Logical Reads | LOB Physical Reads | LOB Read-Ahead Reads | % Logical Reads of Total Reads |
|---|---|---|---|---|---|---|---|---|
| Patients_enc_nondet | 1 | 11,560 | 2 | 11,561 | 0 | 0 | 0 | 100.000 |
| Total | 1 | 11,560 | 2 | 11,561 | 0 | 0 | 0 | |

| | CPU | Elapsed |
|---|---|---|
| SQL Server parse and compile time | 00:00:00.000 | 00:00:00.002 |
| SQL Server Execution Times | 00:00:03.688 | 00:00:03.743 |
| Total | 00:00:03.688 | 00:00:03.745 |

FIG. 32

SQLQuery1.sql

```
DECLARE @MyName VARCHAR(60) = 'patb'

SELECT
    PatientGUID
FROM [dbo].[PatientsLN_cat_enc_det] AS PE
WHERE Token = @MyName
ORDER BY 1;
```

| Results | Messages | Execution Statistics |

Query returned: 333 matches

| Table | Scan Count | Logical Reads | Physical Reads | Read-Ahead Reads | LOB Logical Reads | LOB Physical Reads | LOB Read-Ahead Reads | % Logical Reads of Total Reads |
|---|---|---|---|---|---|---|---|---|
| PatientsLN_cat_enc_det | 1 | 2,008 | 5 | 4,208 | 0 | 0 | 0 | 100.000 |
| Worktable | 0 | 0 | 0 | 0 | 0 | 0 | 0 | 0.000 |
| Total | 1 | 2,008 | 5 | 4,208 | 0 | 0 | 0 | |

| | CPU | Elapsed |
|---|---|---|
| SQL Server parse and compile time | 00:00:00.000 | 00:00:00.042 |
| SQL Server Execution Times | 00:00:00.063 | 00:00:00.060 |
| Total | 00:00:00.063 | 00:00:00.102 |

FIG. 33

```
--Scan
DECLARE @MyName VARCHAR(60) = 'patb'

OPEN SYMMETRIC KEY SymmetricKey1
DECRYPTION BY CERTIFICATE ErxDBCert;

SELECT
    PatientGUID
FROM [dbo].[Patients_enc_nondet] AS PE WITH(INDEX(nci_Patients_enc_nondet_LastName))
WHERE    CONVERT (VARCHAR (60), DECRYPTBYKEY(PE.LastName_enc)) LIKE @MyName + '%'
ORDER BY 1;

CLOSE SYMMETRIC KEY SymmetricKey1;
GO
```

Query 1: Query cost (relative to the batch): 100%

SELECT → Sort (Cost: 41%) → Filter (Cost: 5%) → Compute Scalar (Cost: 1%) → Index Scan (NonClustered) [Patients_enc_nondet].[nci_Patien...]

| | |
|---|---|
| Actual Number of Rows | 1070928 |
| Estimated Number of Rows | 1070930 |
| Estimated Row Size | 127 B |
| Estimated Data Size | 130 MB |

*FIG. 34*

```
CREATE TABLE [dbo].[PatientsLN_cat_enc_det](
    [ID] [int] IDENTITY(1,1) NOT NULL,
    [PatientGUID] [uniqueidentifier] NOT NULL,
    [Token] [varchar](255) COLLATE Latin1_General_BIN2
        ENCRYPTED WITH
        (
            COLUMN_ENCRYPTION_KEY = [PHI_ColumnKey],
            ENCRYPTION_TYPE = Deterministic,
            ALGORITHM = 'AEAD_AES_256_CBC_HMAC_SHA_256'
        ) NULL,
    [Seed] [tinyint] NOT NULL,
PRIMARY KEY CLUSTERED
(
    [ID] ASC
)
) ON [PRIMARY]
GO ALTER TABLE [dbo].[PatientsLN_cat_enc_det] WITH NOCHECK AND FOREIGN KEY([PatientGUID])
REFERENCES [dbo].[Patients] ([PatientGUID])
GO
```

*FIG. 36*

```
DECLARE @MyName VARCHAR(60) = 'patb'

SELECT
    PatientGUID
FROM [dbo].[PatientsLN_cat_enc_det]
WHERE Token = @MyName
ORDER BY 1;
```

@MyName will be converted to a System.Data.SqlClient.SqlParameter object with the following properties...

*FIG. 37*

```
public class subItem
{
    public string token;
    public int seed;

public subItem(int aSeed, string aToken)
    {
        seed = aSeed;
        token = aToken;
    }
} public static class generator
{
    public static List<subItem> generateEndsWith(theString, minSubstringLength)
    {
        List<subItem> ret = new List<subItem>;
        int seedMax = theString.length() - minSubstringLength;
        for(int i=0; i<=seedMax; i++)
        {
            int thisLength = theString.length() - i;
            int firstPos = theString.length() - thisLength;
            ret.Add(new subItem(i, theString.substring(firstPos, thisLength)));
        }
        return ret;
    }
}
```

*FIG. 39*

```
public class subItem
{
    public string token;
    public int seedOne;
    public int seedTwo;

public subItem(int firstSeed, int secondSeed, string aToken)
    {
        token = aToken;
        seedOne = firstSeed;
        seedTwo = secondSeed;
    }
} public static class generator
{
    public static List<subItem> generateContains(theString, minSubstringLength)
    {
        List<subItem> ret = new List<subItem>;
        int seedMax = theString.length() - minSubstringLength;
        for(int i=0; i<=seedMax; i++)
        {
            int thisLength = theString.length() - i;
            for (int j=0; j<=i; j++)
            {
                int firstPos = j;
                ret.Add(new subItem(i, j, theString.substring(firstPos, thisLength)));
            }
        }
        return ret;
    }
}
```

*FIG. 41*

DATABASE METHODOLOGY FOR SEARCHING ENCRYPTED DATA RECORDS

RELATED APPLICATION

This application is a continuation of U.S. patent application Ser. No. 15/859,584, filed on Dec. 31, 2017, and entitled "DATABASE METHODOLOGY FOR SEARCHING ENCRYPTED DATA RECORDS". The entirety of this application is incorporated herein by reference.

INCORPORATION BY REFERENCE

The present application hereby incorporates herein by reference the entire disclosure of Appendix A attached hereto.

COPYRIGHT STATEMENT

All of the material in this patent document, including the computer program listing, is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

COMPUTER PROGRAM LISTING

Submitted concurrently herewith, and incorporated herein by reference, is a structured query language (SQL) script file containing computer executable instructions for use in accordance with an implementation of the present invention. This SQL script file contains scripts for use with Microsoft SQL server and Microsoft SQL server integration services (SSIS). This script file is named "sql.txt", has a creation date of Dec. 29, 2017 at 4:46 PM, and is 6,313 bytes.

BACKGROUND OF THE INVENTION

The present invention generally relates to methodologies for improving the performance of searching data records for encrypted data values containing a search string.

Electronic data is ubiquitous, and applications utilizing electronic data are more and more widespread. One common need for electronic data is to search or filter for data records containing a certain substring, either at the beginning, at the end, or anywhere in the string.

For example, FIG. 1 illustrates a user interface of an electronic health records (EHR) application which allows a user to search for patients having a last name starting with the string "Doe" (this search functionality may be case sensitive or case insensitive). As illustrated, the EHR application has located three patients having a last name starting with the input string.

FIG. 2 illustrates an exemplary "Patients" data table that may be used in accordance with such an EHR application. This "Patients" data table includes patient records for a plurality of patients, including the three located patients which have a last name starting with "Doe".

FIG. 3 illustrates a simplified conventional methodology for locating the patients having a last name starting with "Doe". In particular, FIG. 3 illustrates an SQL query which selects a unique patient ID value (PatientGUID) from the "Patients" data table for each record having a last name that matches the string "Doe%", where the "%" represents a wildcard that is matched by anything (even an empty string " ", thus making it match to "Doe").

In accordance with this simplified conventional methodology, an index can be constructed which is sorted by patient last names, as illustrated in FIG. 4. This sorted index allows a conventional search methodology, such as a binary search algorithm, to be utilized to locate records having a last name value matching the string "Doe%" (i.e. starting with "Doe"). For example, in accordance with a simple binary search algorithm, a middle record of the index could be identified, as illustrated in FIG. 5, and the last name value for this middle record could then be compared to the search string (e.g. "Doe" or "Doe%"), as illustrated in FIG. 6. Because the index is sorted by the last name value, assuming that the last name value of the middle record does not match the comparison value, the comparison can be used to determine which half of the index might contain records matching the comparison value. This process can be repeated to quickly locate any records matching the comparison value without having to compare the last name value of every record, as illustrated in FIG. 7.

It will be appreciated that this is a very simplified conventional methodology for locating records matching a comparison value, but that other methodologies can be used as well. For example, a binary search tree could be used. FIG. 8 illustrates a top of an exemplary binary search tree.

Overall, there exist a wide variety of methodologies for efficiently searching records including plain text values to locate records containing a search string without having to access and compare every single record (e.g. without having to perform an index scan).

Notably, though, security of electronic data is often very important, and electronic data is frequently encrypted. For example, with respect to electronic health record data, it is necessary to encrypt protected health information (PHI). If deterministic encryption is used, then methodologies for efficiently identifying records having a value that is identical to a search string can still be useful, as a search string can be encrypted and compared to stored encrypted values, and an index can be sorted by encrypted values to speed up searching. However, methodologies such as those noted above for efficiently identifying records containing a search string without having to access and compare every single record break down when encrypted data is utilized.

Returning to the previous example, FIG. 9 illustrates a "Patients_enc" data table which includes the same data as the "Patients" data table, only the first name and last name values have been encrypted. Notably, the methodology described above of using an index sorted by last name values is not as useful when the last name values are encrypted, as it is not possible to sort the index by the unencrypted last name values without accessing and decrypting every record, as illustrated in FIG. 10. Thus, a conventional approach for searching for records having a last name value that starts with the string "Doe" would generally involve an index scan requiring accessing and decrypting every record. For example, FIG. 11 illustrates a conventional query which decrypts every record and returns PatientGUID values for those records having a last name value starting with "Doe".

It will be appreciated, however, that a search operation for encrypted records that requires accessing every record is much less efficient than the above-noted methodologies for unencrypted records which do not require accessing every record. Although many conventional methodologies for efficiently searching for data records having a value that is identical to a search string can remain useful with encrypted data, a need remains for a methodology improving the performance of searching for records having an encrypted value that contains a search string.

This, and other needs, are addressed by one or more aspects of the present invention.

SUMMARY OF THE INVENTION

The present invention includes many aspects and features. Moreover, while many aspects and features relate to, and are described in, the context of databases and database operations, the present invention is not limited to use only in this context, as will become apparent from the following summaries and detailed descriptions of aspects, features, and one or more embodiments of the present invention.

Accordingly, one aspect of the present invention relates to a method providing a technical solution to the technical problem of increasing sargability of encrypted records to allow for searching of a first column of a first data table for encrypted values starting with a search string without having to decrypt all encrypted values. The method includes, first, generating, encrypting, and storing in a second data table substring tokens for the first column for records in the first data table by, for each respective data record in the first data table, accessing an encrypted data value for the respective data record from the first column, decrypting the accessed encrypted data value for the respective data record from the first column, generating, from the decrypted data value for the respective data record from the first column, a respective plurality of substrings of different lengths, such generation comprising, for each decrypted data value, determining a length of the decrypted data value, utilizing an incrementing or decrementing seed value and the determined length of the decrypted data value to generate the respective plurality of substrings of different lengths, each generated substring of the respective plurality of substrings being a substring consisting of a different length of sequential characters at the start of the decrypted data value, encrypting, utilizing a deterministic encryption algorithm, each substring of the respective plurality of substrings as an encrypted substring token, and storing, in the second data table, each encrypted substring token in association with a reference value which can be used to lookup a corresponding record in the first data table. The method further comprises, subsequently, searching the first column of the first data table for encrypted values containing a first search string by encrypting the first search string utilizing the deterministic encryption algorithm, searching the second data table for encrypted substring tokens matching the encrypted first search string, and returning, for each encrypted substring token found to match the encrypted first search string based on the associated reference value, an indication of the corresponding record in the first data table.

In a feature of this aspect, the method further comprises generating, encrypting, and storing in a third data table substring tokens for a second column for records in the first data table by, for each respective data record in the first data table, accessing an encrypted data value for the respective data record from the second column, decrypting the accessed encrypted data value for the respective data record from the second column, generating, from the decrypted data value for the respective data record from the second column, a respective plurality of substrings of different lengths, such generation comprising, for each decrypted data value, determining a length of the decrypted data value, utilizing an incrementing or decrementing seed value and the determined length of the decrypted data value to generate the respective plurality of substrings of different lengths, each generated substring of the respective plurality of substrings being a substring consisting of a different length of sequential characters at the start of the decrypted data value, encrypting, utilizing a second deterministic encryption algorithm, each substring of the respective plurality of substrings as an encrypted substring token, and storing, in the third data table, each encrypted substring token in association with a reference value which can be used to lookup a corresponding record in the first data table. In one or more preferred implementations, the second deterministic encryption algorithm used for encrypting substring tokens for the second column for records in the first data table is the same encryption algorithm as the deterministic encryption algorithm used for encrypting substring tokens for the first column for records in the first data table. In one or more preferred implementations, the second deterministic encryption algorithm used for encrypting substring tokens for the second column for records in the first data table is a different encryption algorithm than the deterministic encryption algorithm used for encrypting substring tokens for the first column for records in the first data table. In one or more preferred implementations, the method further comprises subsequently searching the second column of the first data table for encrypted values containing a second search string by encrypting the second search string utilizing the second deterministic encryption algorithm, searching the third data table for encrypted substring tokens matching the encrypted second search string, and returning, for each encrypted substring token found to match the encrypted second search string based on the associated reference value, an indication of the corresponding record in the first data table.

In a feature of this aspect, the deterministic encryption algorithm used for encrypting substring tokens for the first column for records in the first data table is the same encryption algorithm as the encryption algorithm that was used to encrypt encrypted data values in the first column for records in the first data table.

In a feature of this aspect, the deterministic encryption algorithm used for encrypting substring tokens for the first column for records in the first data table is a different encryption algorithm than was used to encrypt encrypted data values in the first column for records in the first data table.

In a feature of this aspect, searching the second data table for encrypted substring tokens matching the encrypted first search string comprises searching utilizing a binary search methodology.

In a feature of this aspect, searching the second data table for encrypted substring tokens matching the encrypted first search string comprises searching utilizing a binary search tree methodology.

In a feature of this aspect, the method comprises use of one or more structured query language (SQL) queries.

In a feature of this aspect, utilizing an incrementing or decrementing seed value and the determined length of the decrypted data value to generate the respective plurality of substrings of different lengths comprises utilizing an incrementing seed value.

In a feature of this aspect, utilizing a decrementing seed value and the determined length of the decrypted data value to generate the respective plurality of substrings of different lengths comprises utilizing an incrementing seed value.

Another aspect relates to a method providing a technical solution to the technical problem of increasing sargability of encrypted records to allow for searching of a first column of a first data table for encrypted values ending with a search string without having to decrypt all encrypted values. The method includes, first, generating, encrypting, and storing in a second data table substring tokens for the first column for records in the first data table by, for each respective data record in the first data table, accessing an encrypted data value for the respective data record from the first column, decrypting the accessed encrypted data value for the respective data record from the first column, generating, from the decrypted data value for the respective data record from the first column, a respective plurality of substrings of different lengths, such generation comprising, for each decrypted data value, determining a length of the decrypted data value, utilizing an incrementing or decrementing seed value and the determined length of the decrypted data value to generate the respective plurality of substrings of different lengths, each generated substring of the respective plurality of substrings being a substring consisting of a different length of sequential characters at the end of the decrypted data value, encrypting, utilizing a deterministic encryption algorithm, each substring of the respective plurality of substrings as an encrypted substring token, and storing, in the second data table, each encrypted substring token in association with a reference value which can be used to lookup a corresponding record in the first data table. The method further includes, subsequently, searching the first column of the first data table for encrypted values containing a first search string by encrypting the first search string utilizing the deterministic encryption algorithm, searching the second data table for encrypted substring tokens matching the encrypted first search string, and returning, for each encrypted substring token found to match the encrypted first search string based on the associated reference value, an indication of the corresponding record in the first data table.

In a feature of this aspect, the deterministic encryption algorithm used for encrypting substring tokens for the first column for records in the first data table is the same encryption algorithm as the encryption algorithm that was used to encrypt encrypted data values in the first column for records in the first data table.

In a feature of this aspect, the deterministic encryption algorithm used for encrypting substring tokens for the first column for records in the first data table is a different encryption algorithm than was used to encrypt encrypted data values in the first column for records in the first data table.

In a feature of this aspect, searching the second data table for encrypted substring tokens matching the encrypted first search string comprises searching utilizing a binary search methodology.

In a feature of this aspect, searching the second data table for encrypted substring tokens matching the encrypted first search string comprises searching utilizing a binary search tree methodology.

In a feature of this aspect, the method comprises use of one or more structured query language (SQL) queries.

In a feature of this aspect, utilizing an incrementing or decrementing seed value and the determined length of the decrypted data value to generate the respective plurality of substrings of different lengths comprises utilizing an incrementing seed value.

In a feature of this aspect, utilizing a decrementing seed value and the determined length of the decrypted data value to generate the respective plurality of substrings of different lengths comprises utilizing an incrementing seed value.

Another aspect relates to a method providing a technical solution to the technical problem of increasing sargability of encrypted records to allow for searching of a first column of a first data table for encrypted values containing a search string without having to decrypt all encrypted values. The method includes, first, generating, encrypting, and storing in a second data table substring tokens for the first column for records in the first data table by, for each respective data record in the first data table, accessing an encrypted data value for the respective data record from the first column, decrypting the accessed encrypted data value for the respective data record from the first column, generating, from the decrypted data value for the respective data record from the first column, a respective plurality of substrings of various lengths, encrypting, utilizing a deterministic encryption algorithm, each substring of the respective plurality of substrings as an encrypted substring token, and storing, in the second data table, each encrypted substring token in association with a reference value which can be used to lookup a corresponding record in the first data table. The method further includes subsequently, searching the first column of the first data table for encrypted values containing a first search string by encrypting the first search string utilizing the deterministic encryption algorithm, searching the second data table for encrypted substring tokens matching the encrypted first search string, and returning, for each encrypted substring token found to match the encrypted first search string based on the associated reference value, an indication of the corresponding record in the first data table.

In a feature of this aspect, the method further comprises generating, encrypting, and storing in a third data table substring tokens for a second column for records in the first data table by, for each respective data record in the first data table, accessing an encrypted data value for the respective data record from the second column, decrypting the accessed encrypted data value for the respective data record from the second column, generating, from the decrypted data value for the respective data record from the second column, a respective plurality of substrings of various lengths, encrypting, utilizing a second deterministic encryption algorithm, each substring of the respective plurality of substrings as an encrypted substring token, and storing, in the third data table, each encrypted substring token in association with a reference value which can be used to lookup a corresponding record in the first data table. In one or more preferred implementations, the second deterministic encryption algorithm used for encrypting substring tokens for the second column for records in the first data table is the same encryption algorithm as the deterministic encryption algorithm used for encrypting substring tokens for the first column for records in the first data table. In one or more preferred implementations, the second deterministic encryption algorithm used for encrypting substring tokens for the second column for records in the first data table is a different encryption algorithm than the deterministic encryption algorithm used for encrypting substring tokens for the first column for records in the first data table. In one or more preferred implementations, the method further comprises subsequently searching the second column of the first data table for encrypted values containing a second search string by encrypting the second search string utilizing the second deterministic encryption algorithm, searching the third data table for encrypted substring tokens matching the encrypted second search string, and returning, for each encrypted substring token found to match the encrypted second search string based on the associated reference value, an indication of the corresponding record in the first data table.

In a feature of this aspect, the deterministic encryption algorithm used for encrypting substring tokens for the first column for records in the first data table is the same encryption algorithm as the encryption algorithm that was used to encrypt encrypted data values in the first column for records in the first data table.

In a feature of this aspect, the deterministic encryption algorithm used for encrypting substring tokens for the first column for records in the first data table is a different encryption algorithm than was used to encrypt encrypted data values in the first column for records in the first data table.

In a feature of this aspect, searching the second data table for encrypted substring tokens matching the encrypted first search string comprises searching utilizing a binary search methodology.

In a feature of this aspect, searching the second data table for encrypted substring tokens matching the encrypted first search string comprises searching utilizing a binary search tree methodology.

In a feature of this aspect, the method comprises use of one or more structured query language (SQL) queries.

Another aspect relates to a method providing a technical solution to the technical problem of increasing sargability of encrypted records to allow for searching of a first column of a first data table for encrypted values containing a search string without having to decrypt all encrypted values. The method includes, first, generating, encrypting, and storing in a second data table substring tokens for the first column for records in the first data table by, for each respective data record in the first data table, accessing an encrypted data value for the respective data record from the first column, decrypting the accessed encrypted data value for the respective data record from the first column, generating, from the decrypted data value for the respective data record from the first column, a respective plurality of substrings of various lengths, such generation comprising, for each decrypted data value, determining a minimum substring length, and utilizing one or more incrementing or decrementing seed values and the determined minimum substring length to generate the respective plurality of substrings of different lengths, each generated substring of the respective plurality of substrings being a substring of at least the minimum substring length consisting of sequential characters within the decrypted data value, encrypting, utilizing a deterministic encryption algorithm, each substring of the respective plurality of substrings as an encrypted substring token, and storing, in the second data table, each encrypted substring token in association with a reference value which can be used to lookup a corresponding record in the first data table. The method further includes, subsequently, searching the first column of the first data table for encrypted values containing a first search string by encrypting the first search string utilizing the deterministic encryption algorithm, searching the second data table for encrypted substring tokens matching the encrypted first search string, and returning, for each encrypted substring token found to match the encrypted first search string based on the associated reference value, an indication of the corresponding record in the first data table.

In addition to the aforementioned aspects and features of the present invention, it should be noted that the present invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the present invention now will be described in detail with reference to the accompanying drawings, wherein the same elements are referred to with the same reference numerals.

FIG. 1 illustrates a user interface of an electronic health records (EHR) application.

FIG. 3 illustrates a simplified conventional methodology for locating patients having a last name starting with "Doe".

FIG. 4 illustrates a constructed index sorted by last name values.

FIG. 10 illustrates an index constructed with encrypted first and last name values.

FIG. 11 illustrates a conventional query which decrypts every record and returns PatientGUID values for those records having a last name value starting with "Doe".

FIG. 13 provides pseudo-code illustrating exemplary program structure that could be used in accordance with one or more preferred implementations.

FIG. 18 illustrates a constructed index sorted by encrypted substring token values.

FIG. 21 illustrates identifier values which can be used as a reference value to match an index record to a record in another data table and return results.

FIG. 22 illustrates query results including encrypted values.

FIG. 23 illustrates query results including unencrypted values.

FIG. 25 illustrates an exemplary SQL query which is run to select "PatientGUID" and "LastName" fields from a single record from a "Patients" data table.

FIG. 26 illustrates an exemplary SQL query which is run to select a record from a "Patients_enc_nondet" data table.

FIG. 28 illustrates exemplary Transact-SQL (T-SQL) code for generating substring tokens for a "Patients_enc_nondet" data table based on a "Patients" data table.

FIG. 29 illustrates an exemplary SQL query which is run to select a record from a "Patients_enc_nondet" data table that has a "PatientGUID" value matching a "PatientGUID" value selected from a "Patients" data table.

FIG. 30 illustrates records with tokens displayed in unencrypted form.

FIG. 31 illustrates definition of a "Token" column of a "PatientsLN_cat_enc_det" data table to use a deterministic encryption option.

FIG. 32 illustrates the result of SQL queries showing that two data tables contain the same number of unique "PatientGUID" values.

FIG. 33 illustrates a query utilizing a "Patients_enc_nondet" data table which required decrypting every encrypted last name value stored in a "LastName_enc" field in the "Patients_enc_nondet" data table in order to identify the records for patients having a last name starting with "patb".

FIG. 34 illustrates a query utilizing a "PatientsLN_cat_enc_det" containing encrypted substrings.

FIG. 36 illustrates the execution plan for a query utilizing a "PatientsLN_cat_enc_det" data table.

FIG. 37 illustrates definition of a "@MyName" variable.

FIG. 39 provides pseudo-code illustrating exemplary program structure that could be used in accordance with one or more preferred implementations.

FIG. 41 provides pseudo-code illustrating exemplary program structure that could be used in accordance with one or more preferred implementations.

DETAILED DESCRIPTION

Figure 2:
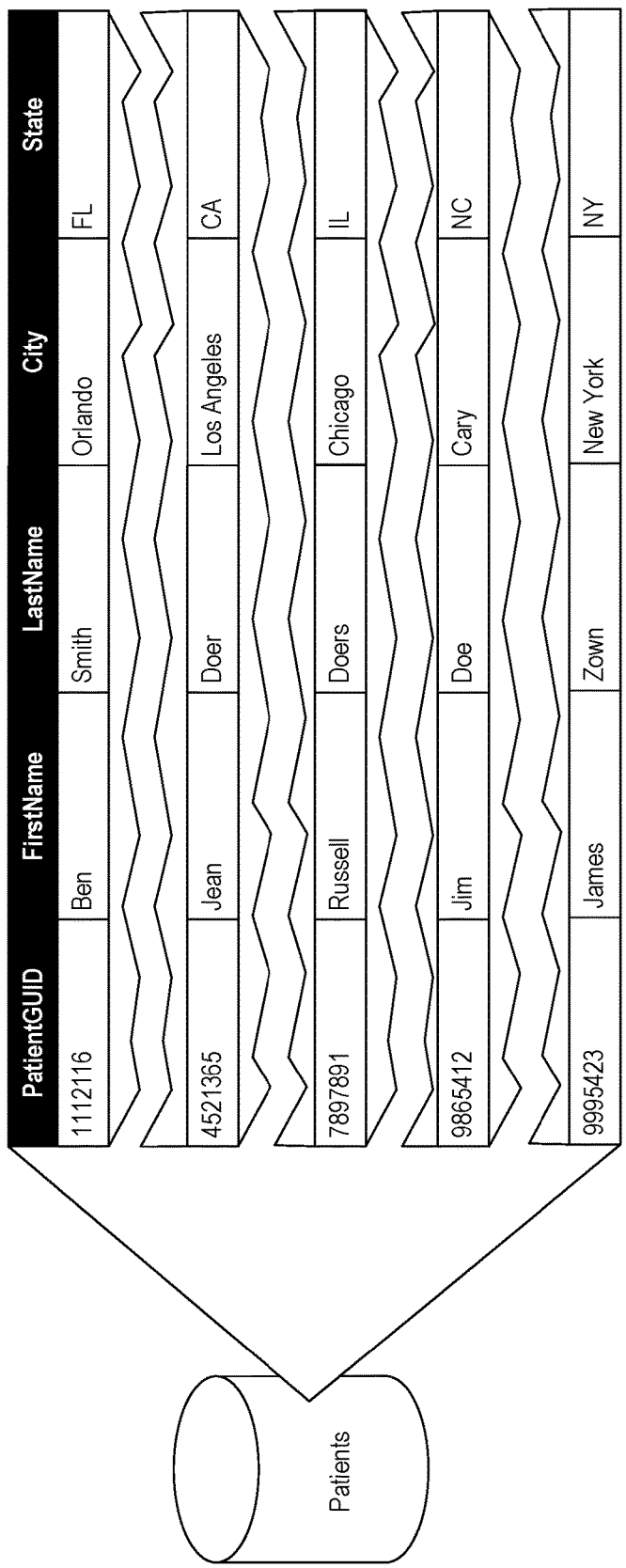
FIG. 2 illustrates an exemplary "Patients" data table.
Figure 5:
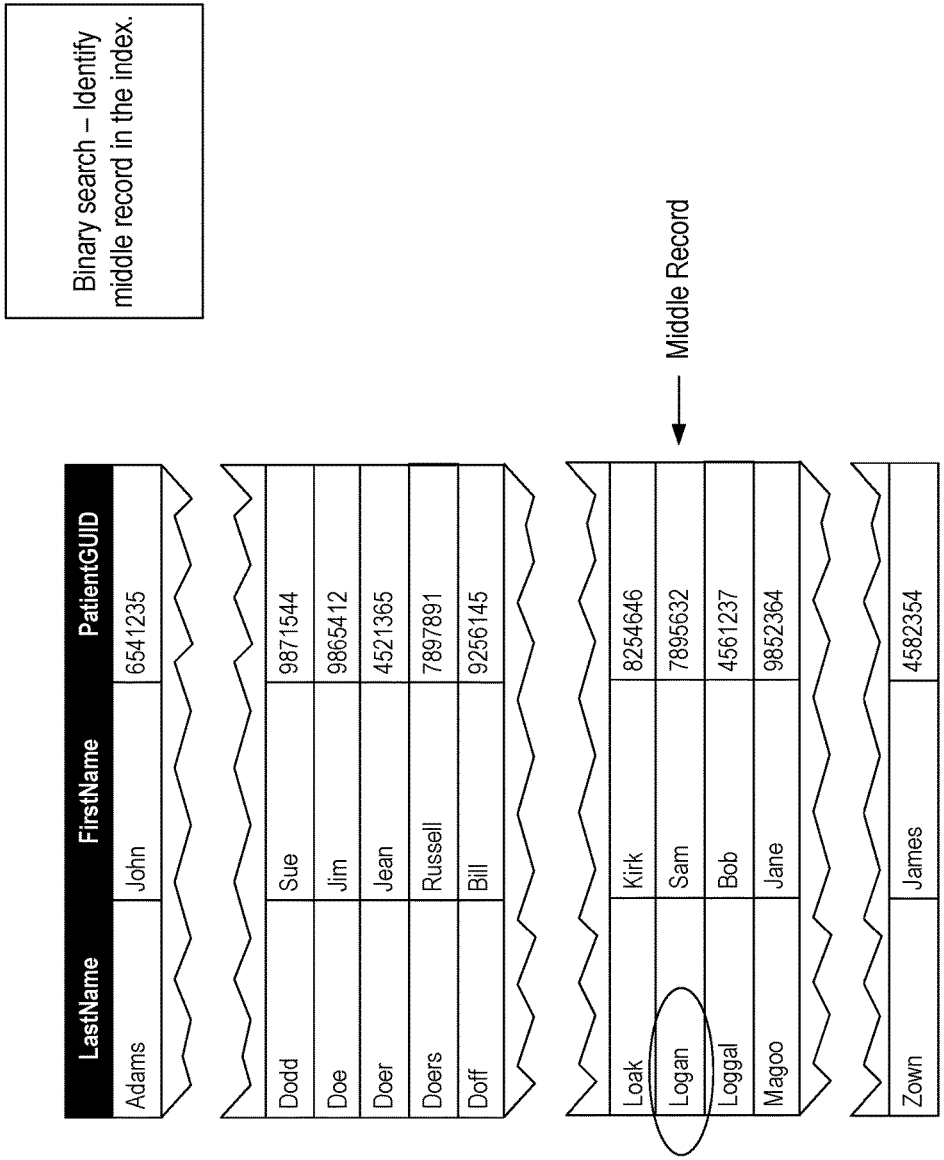
FIGS. 5-7 illustrate exemplary steps of a simple binary search methodology.
Figure 6:
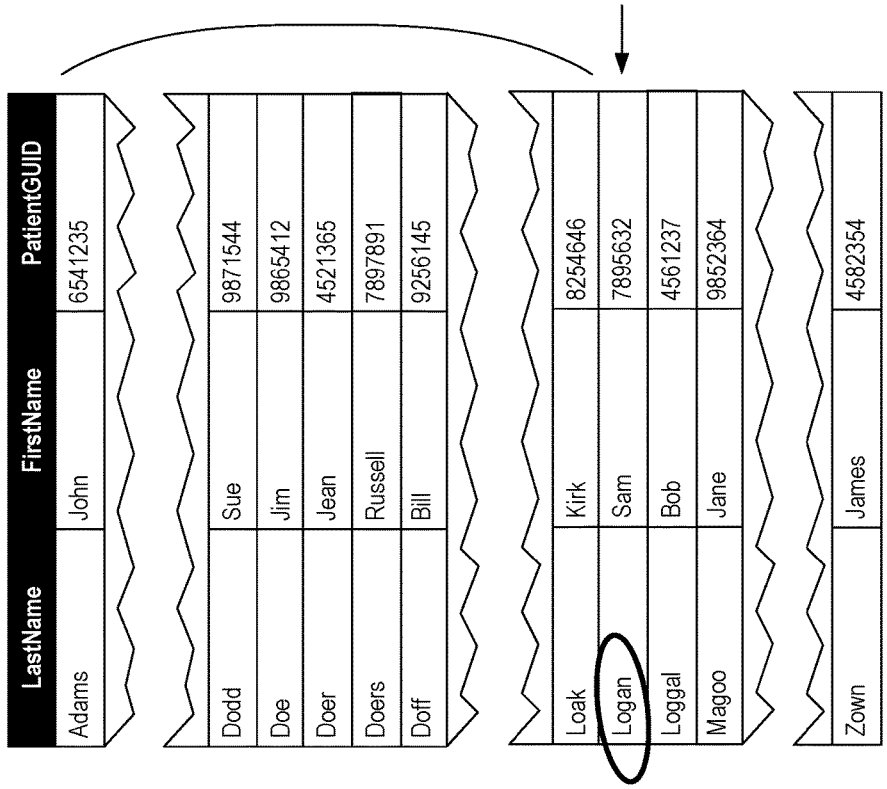
Figure 7:
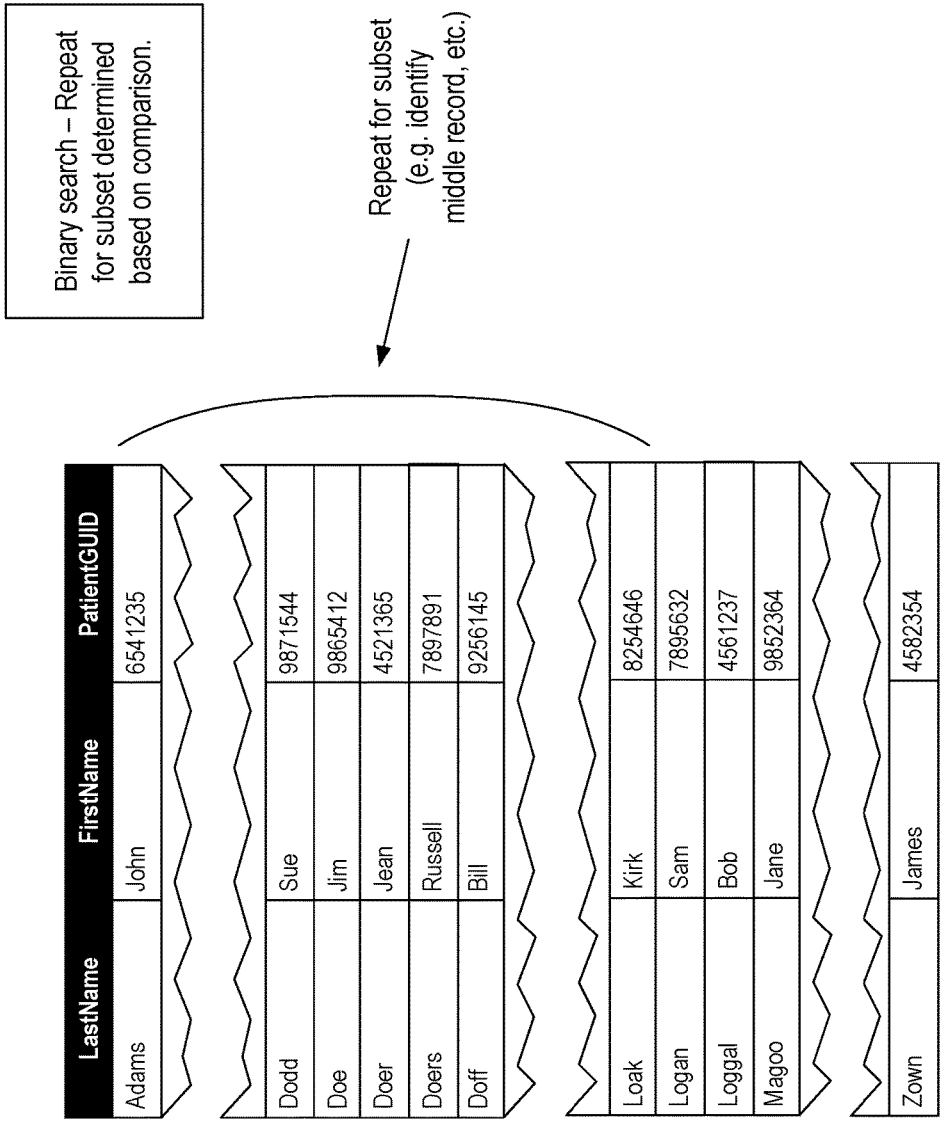
Figure 8:
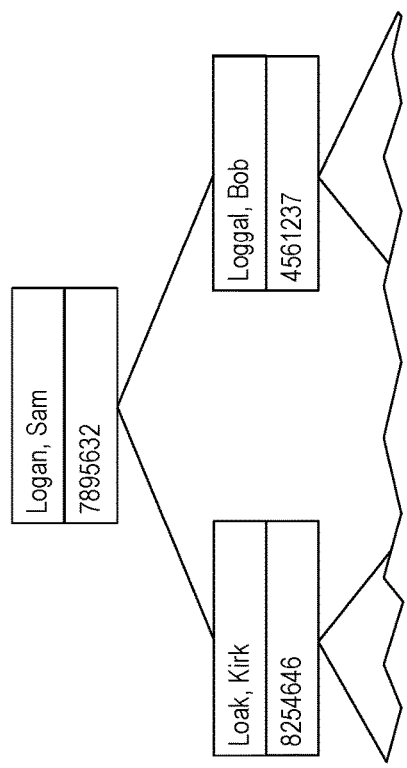
FIG. 8 illustrates a portion of a simple binary search tree.
Figure 9:
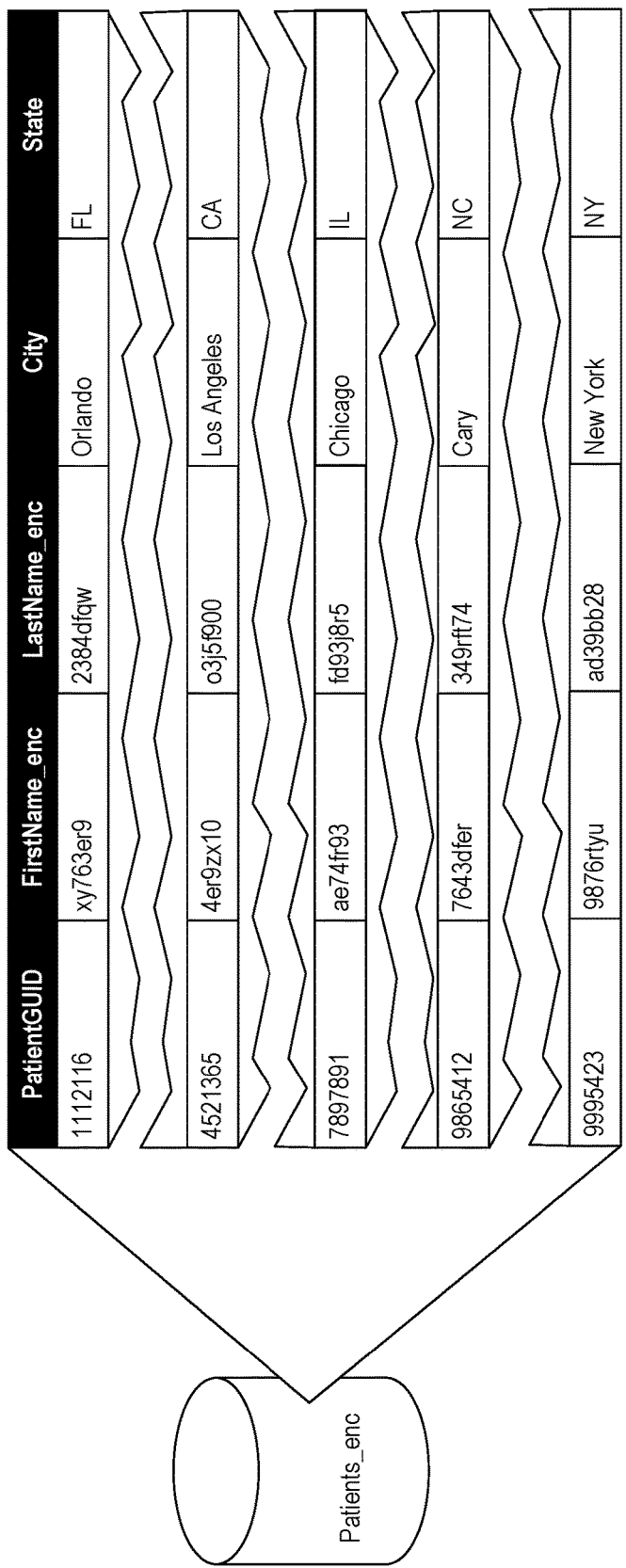
FIG. 9 illustrates a data table having encrypted first and last name values.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention, and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one", but does not exclude a plurality unless the contextual use dictates otherwise. Thus, reference to "a picnic basket having an apple" describes "a picnic basket having at least one apple" as well as "a picnic basket having apples". In contrast, reference to "a picnic basket having a single apple" describes "a picnic basket having only one apple".

When used herein to join a list of items, "or" denotes "at least one of the items", but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers". When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese".

Referring now to the drawings, one or more preferred embodiments of the invention are next described. The following description of one or more preferred embodiments is merely exemplary in nature and is in no way intended to limit the invention, its implementations, or uses.

As noted above, conventional methodologies for efficiently identifying records containing a search string without having to access and compare every single record break down when encrypted data is utilized. Instead, conventionally such a search generally requires accessing and decrypting every record, as described above with respect to FIGS. 10-11.

In accordance with one or more preferred implementations, a methodology involves generating and storing a plurality of substrings for a data value and using stored substrings to facilitate subsequent searching.

Figure 12:
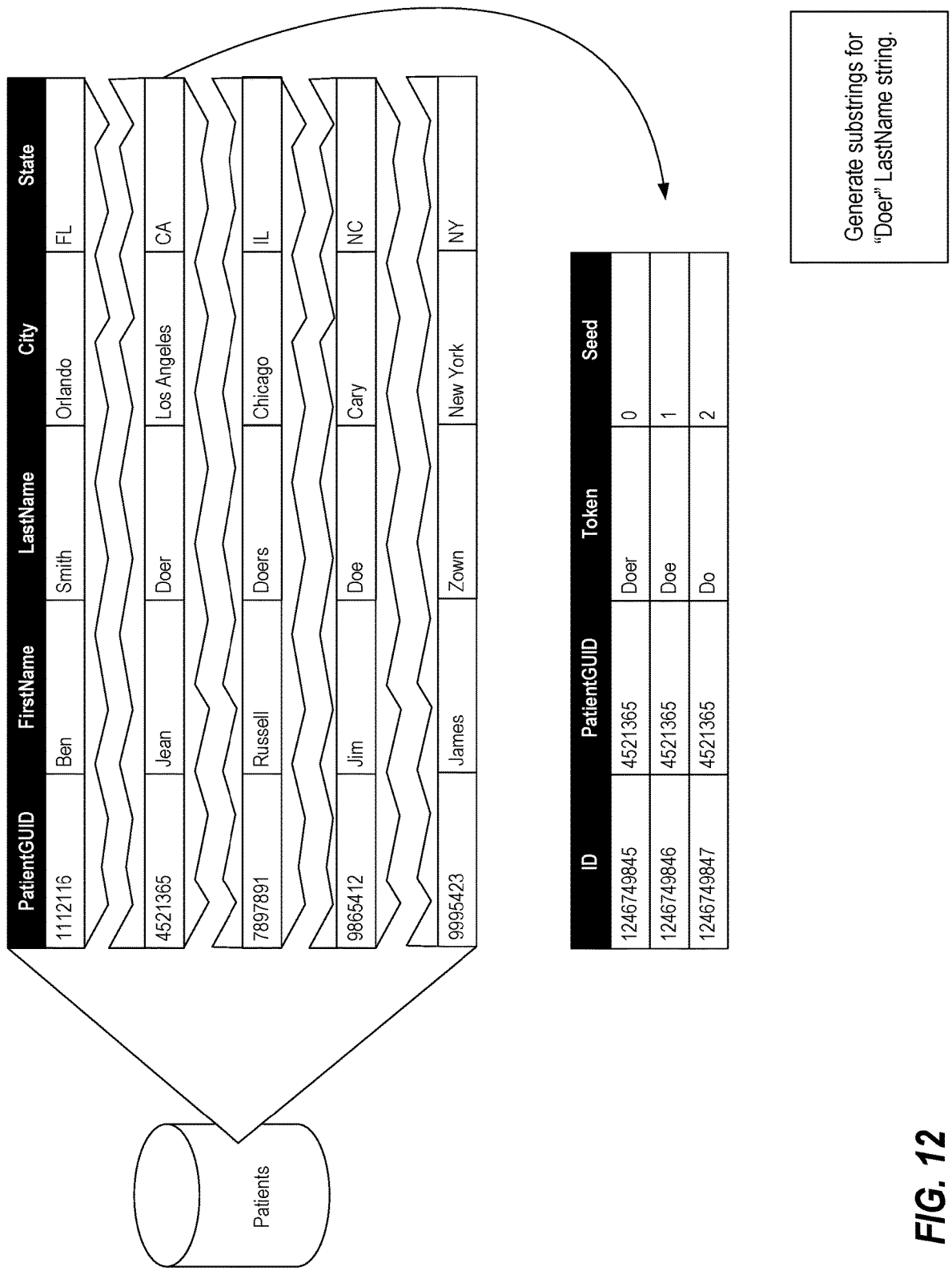
FIG. 12 illustrates generation of a plurality of substrings for the LastName data value of "Doer" for the record having a PatientGUID of "4521365".

Returning to the example of the "Patients" data table of FIG. 2, FIG. 12 illustrates generation of a plurality of substrings for the LastName data value of "Doer" for the record having a PatientGUID of "4521365". In particular, this includes a substring consisting of the complete string "Doer", a substring consisting of the first three letters "Doe", and a substring consisting of the first two letters "Do".

In accordance with one or more preferred implementations, these substrings are generated based on an algorithm using one or more seed values. In the illustrated example, seed values are determined based on the length of the string to generate substrings for, e.g. seed values of "0", "1", and "2" are used for the string "Doer" having a length of four. Each substring is generated based on the seed value, e.g. the first substring "Doer" can be understood as being a substring defined from the zeroth position of the string "Doer" and having a length equal to the length of the strong "Doer" minus the seed value of "0". Similarly, the second substring "Doe" can be understood as being a substring defined from the zeroth position of the string "Doer" and having a length equal to the length of the strong "Doer" minus the seed value of "1". Finally the substring "Do" can be understood as being a substring defined from the zeroth position of the string "Doer" and having a length equal to the length of the strong "Doer" minus the seed value of "2".

As explained and described in more detail hereinbelow, this particular methodology for generating substrings is utilized in order to facilitate searching for records having a value that starts with a specified search string. FIG. 13 provides pseudo-code illustrating exemplary program structure that could be used in accordance with such a methodology.

As outlined in more detail hereinbelow, other methodologies may be utilized to facilitate searching for records having a value that ends with a particular search string, or records having a value that merely contains a particular search string somewhere therein.

Figure 14:
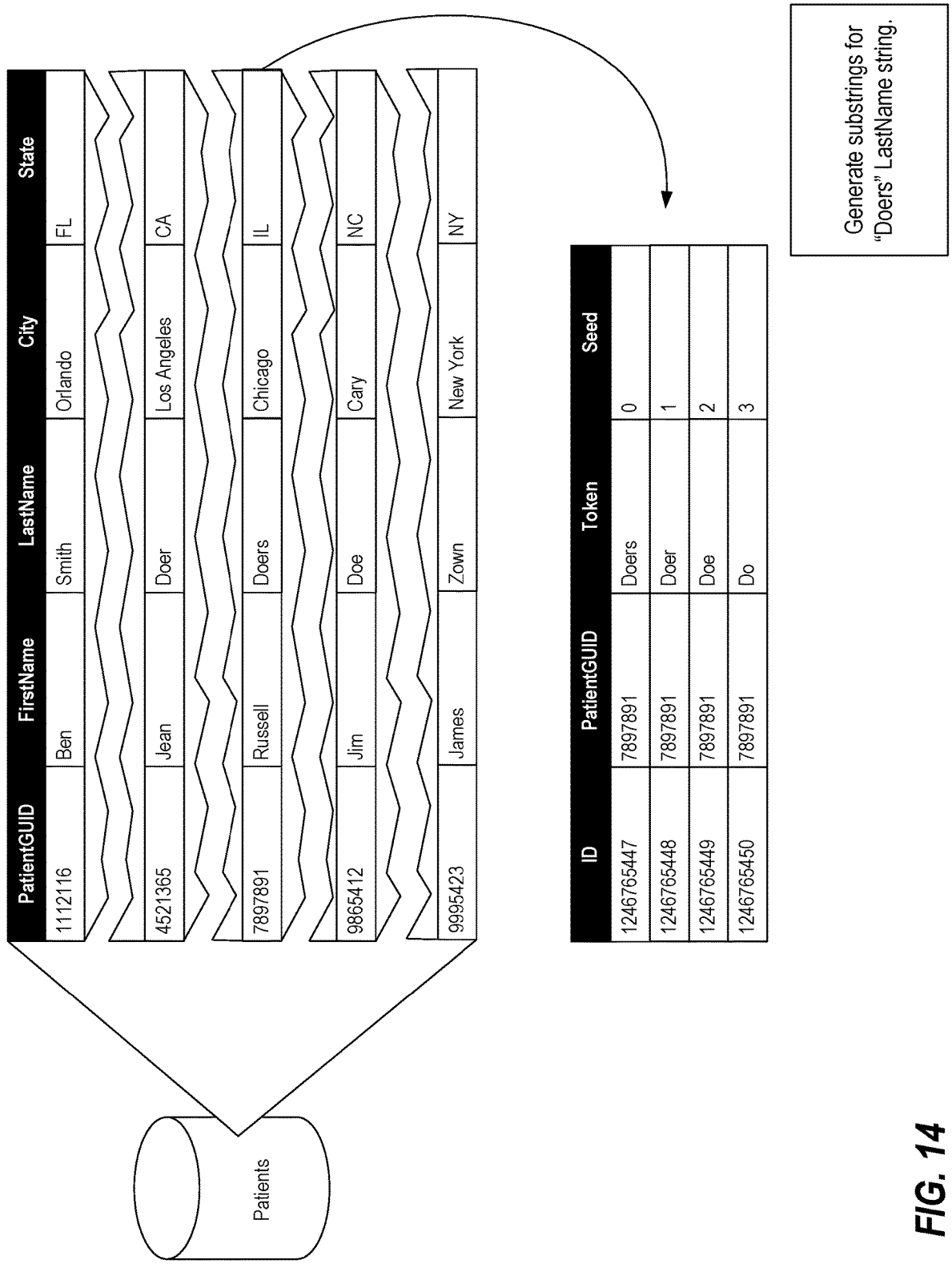
FIG. 14 illustrates generation of a plurality of substrings for the LastName data value of "Doers" for the record having a PatientGUID of "7897891".

Returning to the example of FIG. 12, FIG. 14 similarly illustrates generation of a plurality of substrings for the LastName data value of "Doers" for the record having a PatientGUID of "7897891". In particular, this includes a substring consisting of the complete string "Doers", a substring consisting of the first four letters "Doer", a substring consisting of the first three letters "Doe", and a substring consisting of the first two letters "Do".

The first substring "Doers" can be understood as being a substring defined from the zeroth position of the string "Doers" and having a length equal to the length of the strong "Doers" minus the seed value of "0". Similarly, the second substring "Doer" can be understood as being a substring defined from the zeroth position of the string "Doers" and having a length equal to the length of the strong "Doers" minus the seed value of "1". The substring "Doe" can be understood as being a substring defined from the zeroth position of the string "Doers" and having a length equal to the length of the strong "Doers" minus the seed value of "2". Finally, the substring "Do" can be understood as being a substring defined from the zeroth position of the string "Doers" and having a length equal to the length of the strong "Doers" minus the seed value of "3".

Figure 15:
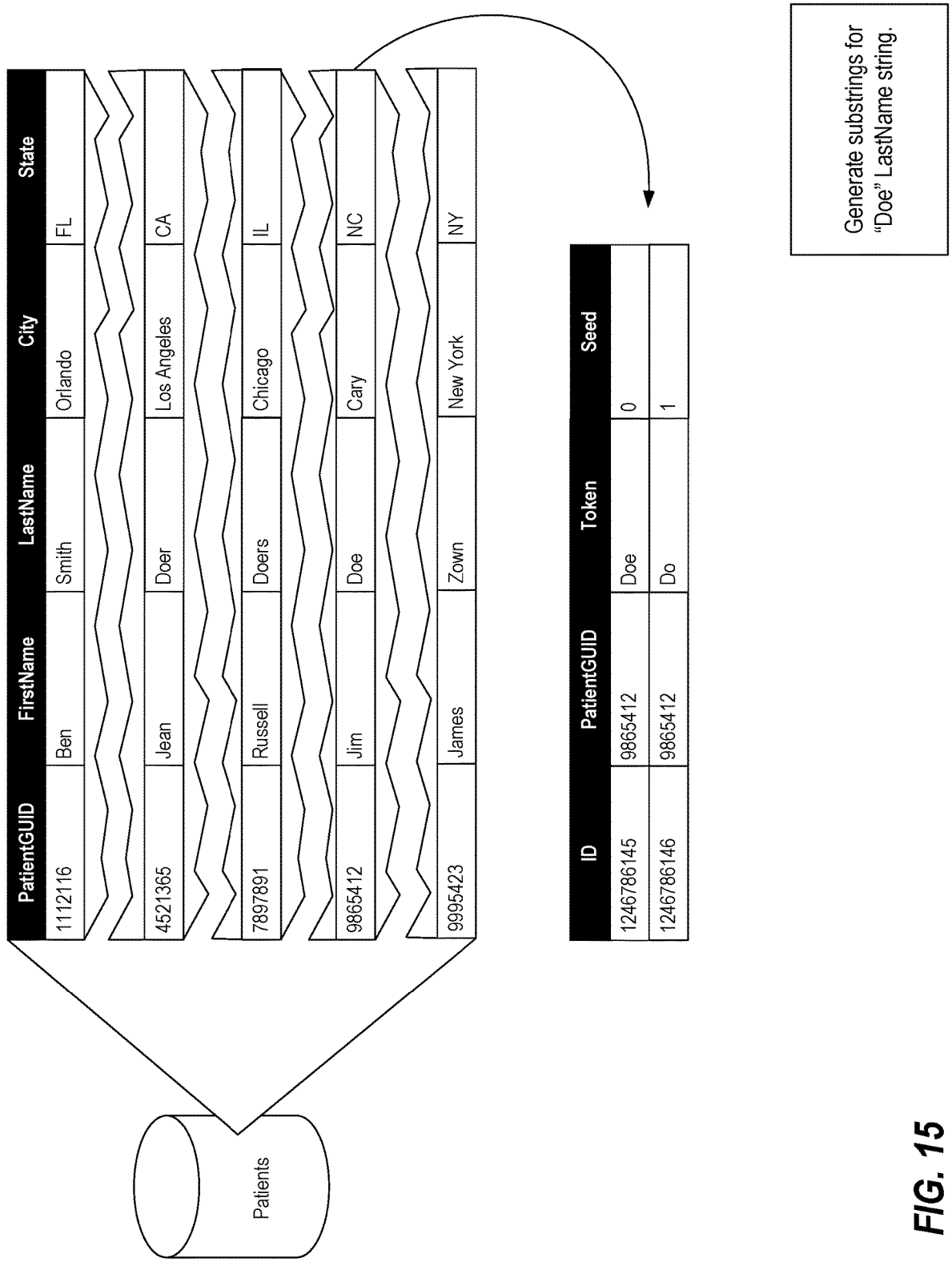
FIG. 15 illustrates generation of a plurality of substrings for the LastName data value of "Doe" for the record having a PatientGUID of "9865412".

FIG. 15 similarly illustrates generation of a plurality of substrings for the LastName data value of "Doe" for the record having a PatientGUID of "9865412". In particular, this includes a substring consisting of the complete string "Doe" and a substring consisting of the first two letters "Do".

The first substring "Doe" can be understood as being a substring defined from the zeroth position of the string "Doe" and having a length equal to the length of the strong "Doe" minus the seed value of "0". Similarly, the second substring "Do" can be understood as being a substring defined from the zeroth position of the string "Doe" and having a length equal to the length of the strong "Doe" minus the seed value of "1".

Figure 16:
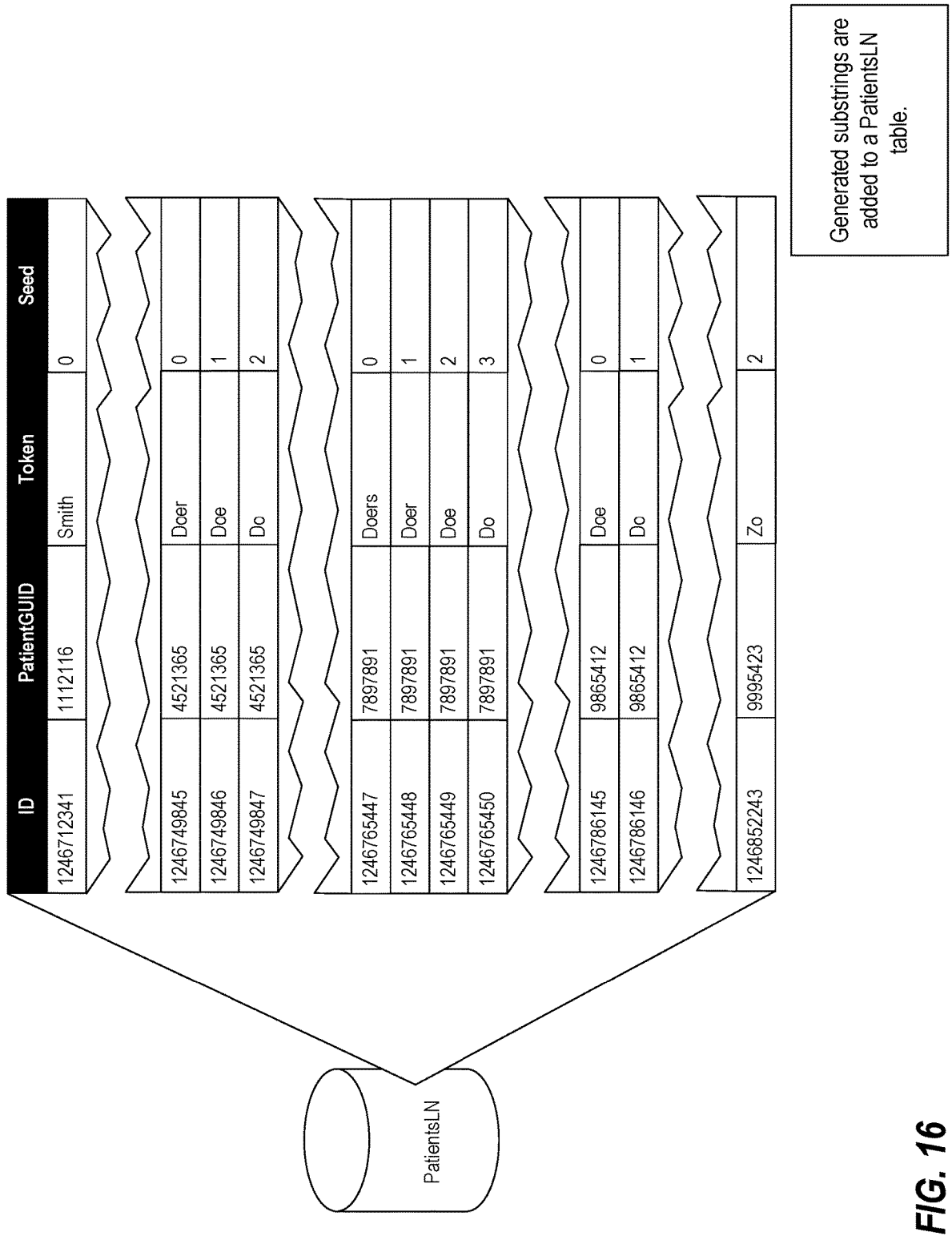
FIG. 16 illustrates a data table including generated substring tokens.

Although substring tokens are only illustrated as being generated for these records, in accordance with one or more preferred implementations, substring tokens are generated for each record in the "Patients" data table, and these generated substring tokens are added as records to a "PatientsLN" data table, as illustrated in FIG. 16. This "PatientsLN" data table is configured to facilitate searching for records having a last name value that starts with a specified search string.

Figure 17:
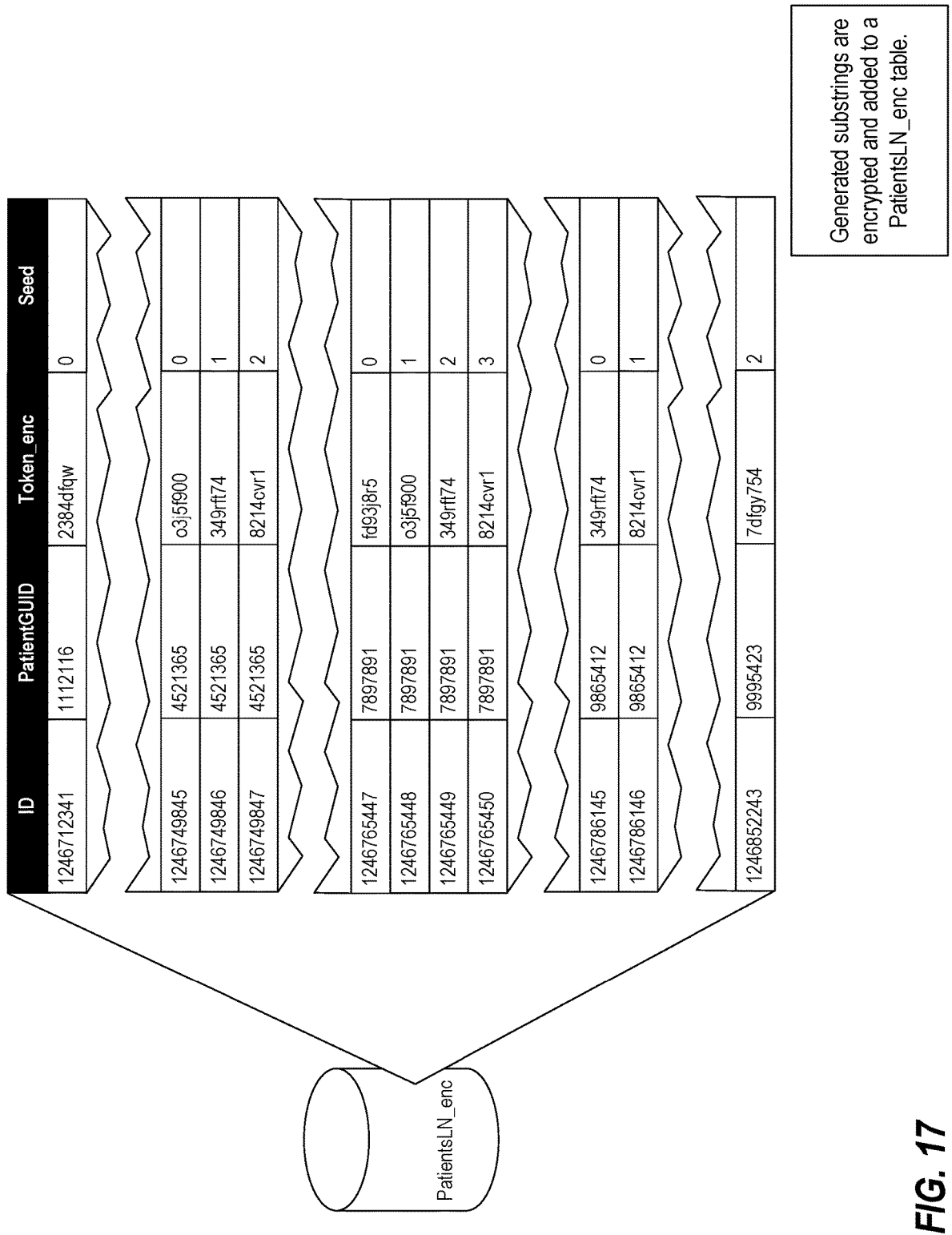
FIG. 17 illustrates a data table including encrypted substring tokens.

However, rather than these generated substring tokens being stored as unencrypted plain text, as illustrated in FIG. 16, these generated substring tokens are first encrypted using deterministic encryption and are stored as encrypted substring tokens in a "PatientsLN_enc" data table, as illustrated in FIG. 17.

Although generation of substring tokens was illustrated hereinabove with respect to the "Patients" data table for ease of illustration, in accordance with one or more preferred implementations, generation of substring tokens is based on records in a first data table such as the "Patients_enc" data table which includes encrypted values, and this process involves decrypting a value for which substrings are to be generated, generating substring tokens, and then encrypting the generated substring tokens before storing them in a second table. In accordance with one or more preferred implementations, the substring tokens are encrypted utilizing the same encryption algorithm as used to generate encrypted values in the first encrypted data table, although in at least some implementations different encryption algorithms may be utilized. The encryption algorithm used for the generated substring tokens is preferably a deterministic encryption algorithm.

Returning to the example, subsequently, when there is a need to search for all records in the "Patients_enc" data table starting with a specified search string, the "PatientsLN_enc" data table can be used to facilitate searching.

Figure 19:
FIG. 19 illustrates encryption of a search string.
Figure 20:
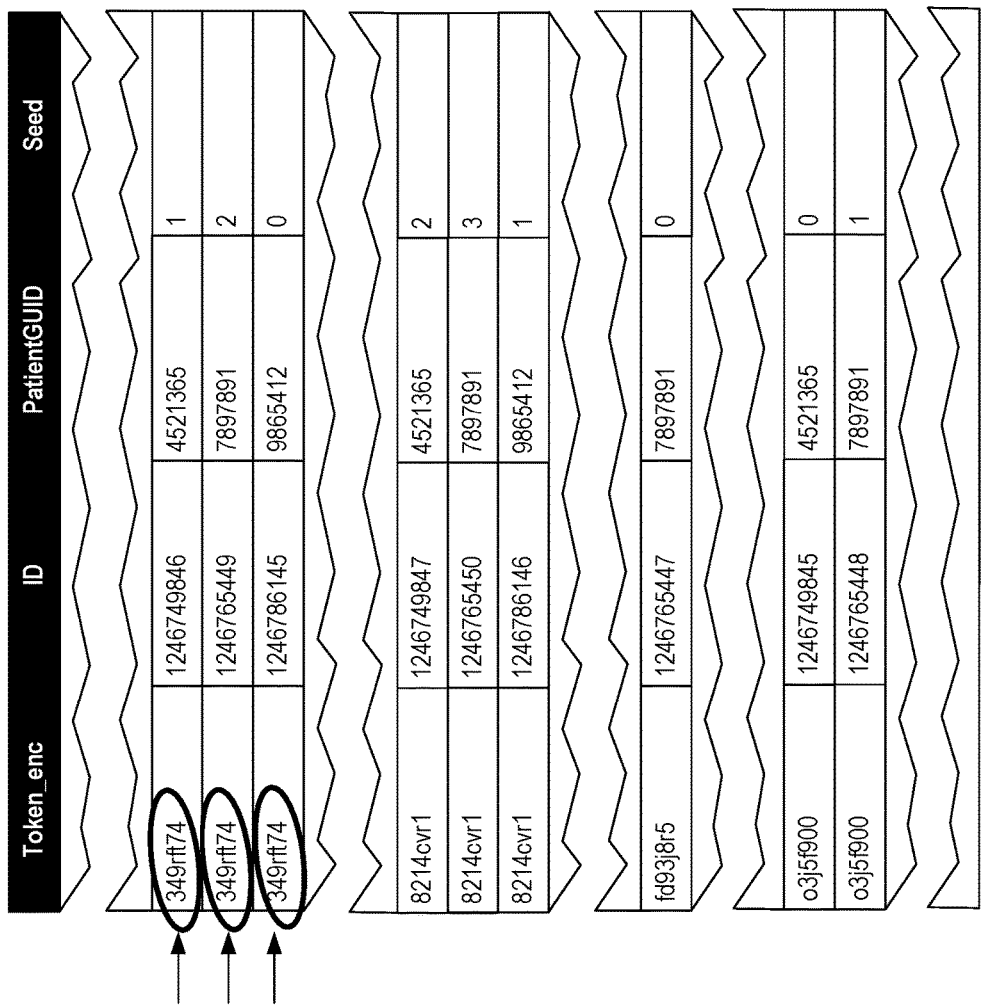
FIG. 20 illustrates matching of an encrypted search string to encrypted substring token values.

For example, returning to a search for records having a LastName value starting with the search string "Doe", an index can be constructed based on the "PatientsLN_enc" data table that is sorted by the encrypted "Token_enc" values representing generated substrings that have been encrypted, as illustrated in FIG. 18. The "Doe" search string can be encrypted utilizing the same deterministic encryption algorithm used to encrypt the substring tokens, as illustrated in FIG. 19, and can then be used to locate records having a "Token_enc" value that matches the encrypted search string, as illustrated in FIG. 20. Importantly, because the index is sorted by the encrypted substring token values and there is only a need to identically match the encrypted search value to encrypted substring token values, more efficient searching strategies and operations such as binary search algorithms and binary search trees may be utilized obviating the need to access every record, even though the data is encrypted.

That is, such an approach can be characterized as increasing sargability (Search ARGument ABILITY) of queries for encrypted values containing a search string. The use of encrypted substrings increases sargability by allowing for use of an index or other strategy to more efficiently search.

In accordance with various preferred implementations, these more efficient search strategies such as binary search algorithms and binary search trees are utilized. In accordance with one or more preferred implementations, operations such as SQL queries or other higher level language queries are configured to take advantage of such more efficient search strategies and obviate the need to access every record.

Returning to the example, a system can then return results based on identified records in an index or the "Token_enc" data table. For example, a system may return ID or PatientGUID values for records in the "Token_enc" data table found to be a match, as illustrated in FIG. 21. Query results may be returned in either encrypted form, as illustrated in FIG. 22, or unencrypted form, as illustrated in FIG. 23.

Methodologies disclosed herein involving generating and storing a plurality of substrings for a data value and using stored substrings to facilitate subsequent searching have advantages over conventional methodologies which require accessing and decrypting every record.

In order to illustrate exemplary efficiency savings, an exemplary conventional methodology utilizing nondeterministic encryption will now be described.

Figure 24:
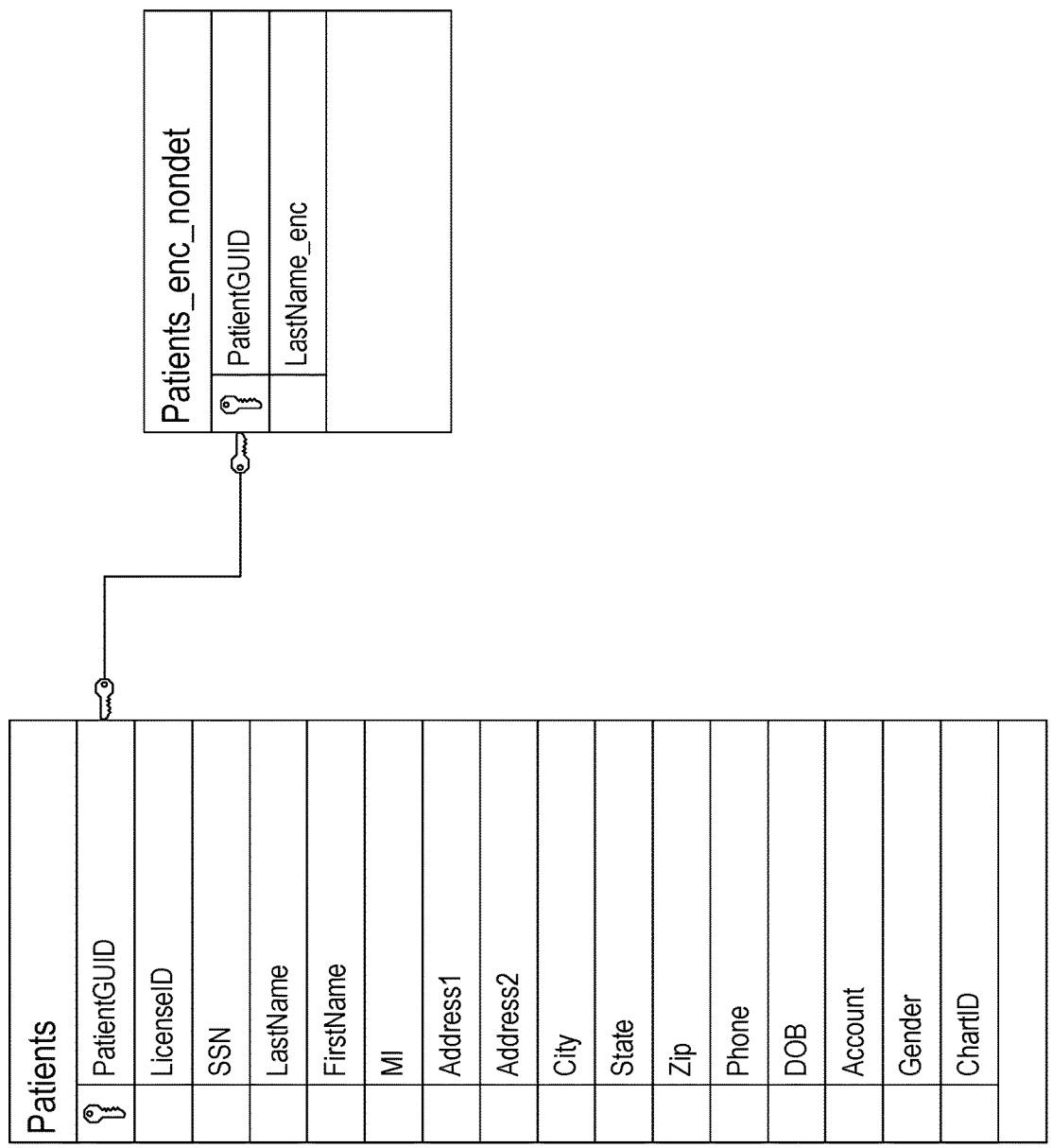
FIG. 24 illustrates an exemplary architecture for a "Patients" data table containing test data and a "Patients_enc_nondet" data table configured to store encrypted last name values in a "LastName_enc" field.

FIG. 24 illustrates an exemplary architecture for a "Patients" data table containing test data and a "Patients_enc_nondet" data table configured to store encrypted last name values in a "LastName_enc" field. The "Patients_enc_nondet" data table has been populated with records including encrypted last names from the "Patients" data table that were encrypted using nondeterministic encryption.

FIG. 25 illustrates an exemplary SQL query which is run to select "PatientGUID" and "LastName" fields from a single record from the "Patients" data table. The selected record has a "PatientGUID" value of "7000F552-4A98-4B08-AB6B-FE601FE44D55". The "Patients" data table contains test data, and so the last name value for the record is "patdemolnk82", even though that is not a conventional last name that a patient would be expected to have.

FIG. 26 illustrates an exemplary SQL query which is run to select a record from the "Patients_enc_nondet" data table that has a "PatientGUID" value matching the "PatientGUID" value just selected from the "Patients" data table. The exemplary SQL query returns an encrypted "LastName_enc" value which is an encrypted value representing an encrypted version of the patient's last name.

Figure 27:
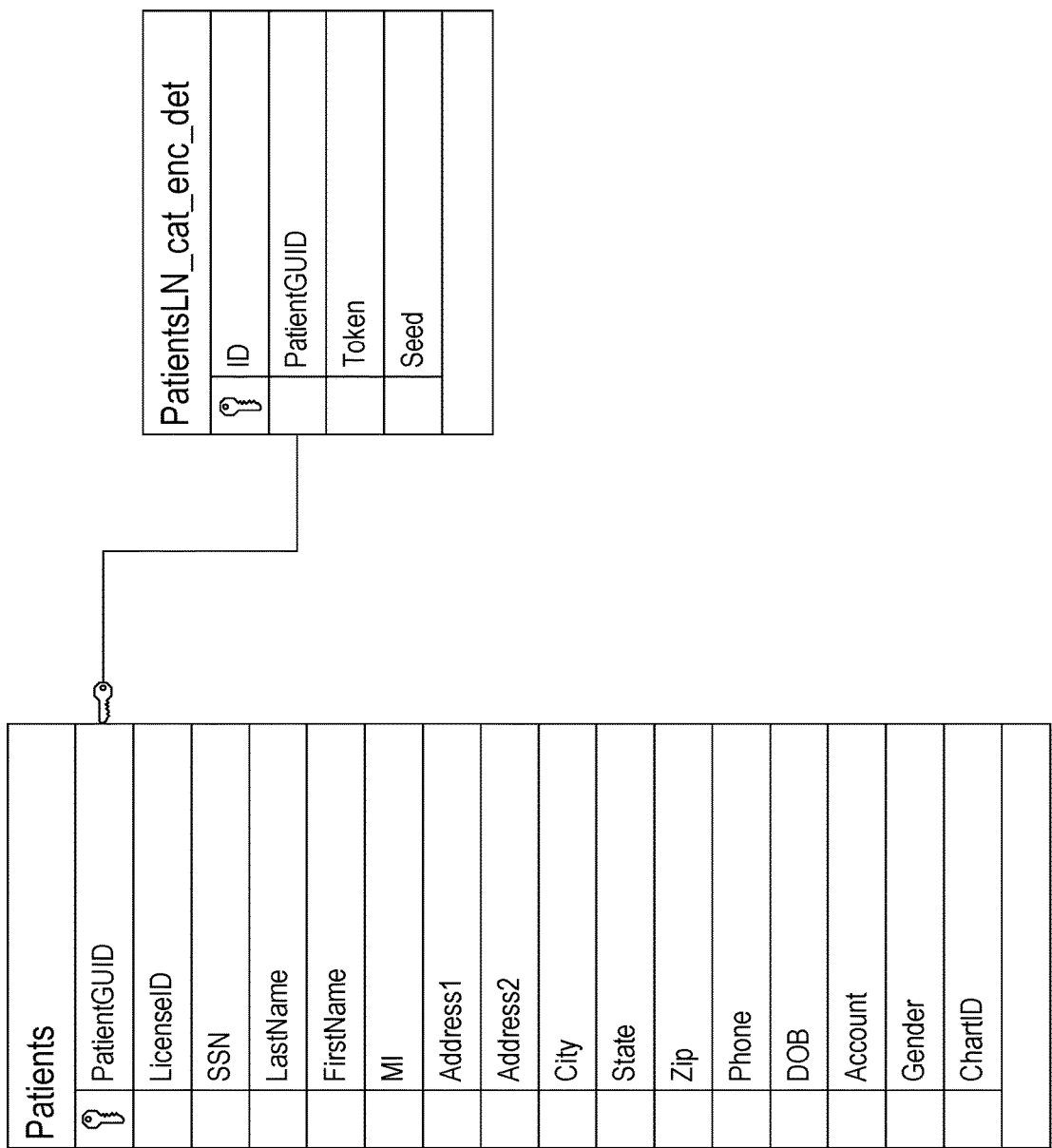
FIG. 27 illustrates exemplary architecture for a "PatientsLN_cat_enc_det" data table configured to store encrypted substring tokens in accordance with one or more preferred implementations.

In contrast to an approach utilizing this "Patients_enc_nondet" data table, FIG. 27 illustrates the exemplary architecture for the same "Patients" data table containing the same test data and a "PatientsLN_cat_enc_det" data table configured to store encrypted substring tokens in accordance with one or more preferred implementations. The "PatientsLN_cat_enc_det" data table has been populated with records including encrypted substring tokens that were generated from last names from the "Patients" data table and then encrypted using deterministic encryption. FIG. 28 illustrates exemplary Transact-SQL (T-SQL) code for generating substring tokens for the "Patients_enc_nondet" data table based on the "Patients" data table.

FIG. 29 illustrates an exemplary SQL query which is run to select a record from the "Patients_enc_nondet" data table that has a "PatientGUID" value matching the "PatientGUID" value selected from the "Patients" data table. The exemplary SQL query returns records having encrypted substring tokens which are encrypted values representing encrypted versions of generated substrings of the patient's last name. For the sake of clarity, FIG. 30 illustrates the same records with the tokens displayed in unencrypted form, although it will be appreciated that the tokens are preferably stored in encrypted form.

In accordance with a preferred implementation, a "Token" column of the "PatientsLN_cat_enc_det" data table is defined using a deterministic encryption option from the Always Encrypted SQL Server feature set of Microsoft SQL Server, as illustrated in FIG. 31.

Following population of both the "Patients_enc_nondet" data table and the "PatientsLN_cat_enc_det" data table based on the same "Patients" data table, both data tables have encrypted records for the same set of patients, as can be seen in FIG. 32, which illustrates the result of SQL queries showing that both data tables contain the same number of unique "PatientGUID" values, namely "1070928" unique "PatientGUID" values, indicating that each table is storing encrypted last name data for "1070928" unique patients.

In order to illustrate exemplary efficiency savings from use of a data table configured to store encrypted substring tokens in accordance with one or more preferred implementations, exemplary queries for searching for patients having a last name beginning with "patb" were performed on the same test data from the "Patients" data table using both (i) the "Patients_enc_nondet" data table storing encrypted last name values, and (ii) the "PatientsLN_cat_enc_det" data table storing encrypted substring tokens. Notably, the previously illustrated last name value of "patdemolnk82" would not be returned as a result, as it does not start with "patb".

FIG. 33 illustrates a first query utilizing the "Patients_enc_nondet" data table which required decrypting every encrypted last name value stored in a "LastName_enc" field in the "Patients_enc_nondet" data table in order to identify the records for patients having a last name starting with "patb". Notably, this first query required 11,560 reads, took up 3.688 seconds of CPU time, and required a total elapsed time of 3.745 seconds to complete and return 333 matches.

FIG. 34 illustrates a second query utilizing the "PatientsLN_cat_enc_det" containing encrypted substrings. In contrast to the first query, the second query did not require decrypting every last name value, and the SQL server was able to leverage efficient search techniques to return the same 333 matches much more efficiently. In particular, this second query only required 2,008 reads (~17% of the previous amount), only took up 0.063 seconds of CPU time (~2% of the previous amount), and only required a total elapsed time of 0.102 seconds to complete and return the same 333 matches (~3% of the previous amount).

Notably, this test was performed against a base record set of around one million rows, resulting in data for 1070928 unique patients in the "Patients" data table. The difference in performance is directly correlated to the size of the base record set, and it is believed that it would be significantly higher with larger base record sets.

The execution plans of these queries can help to explain the difference in performance and the impact on sargability.

Figure 35:
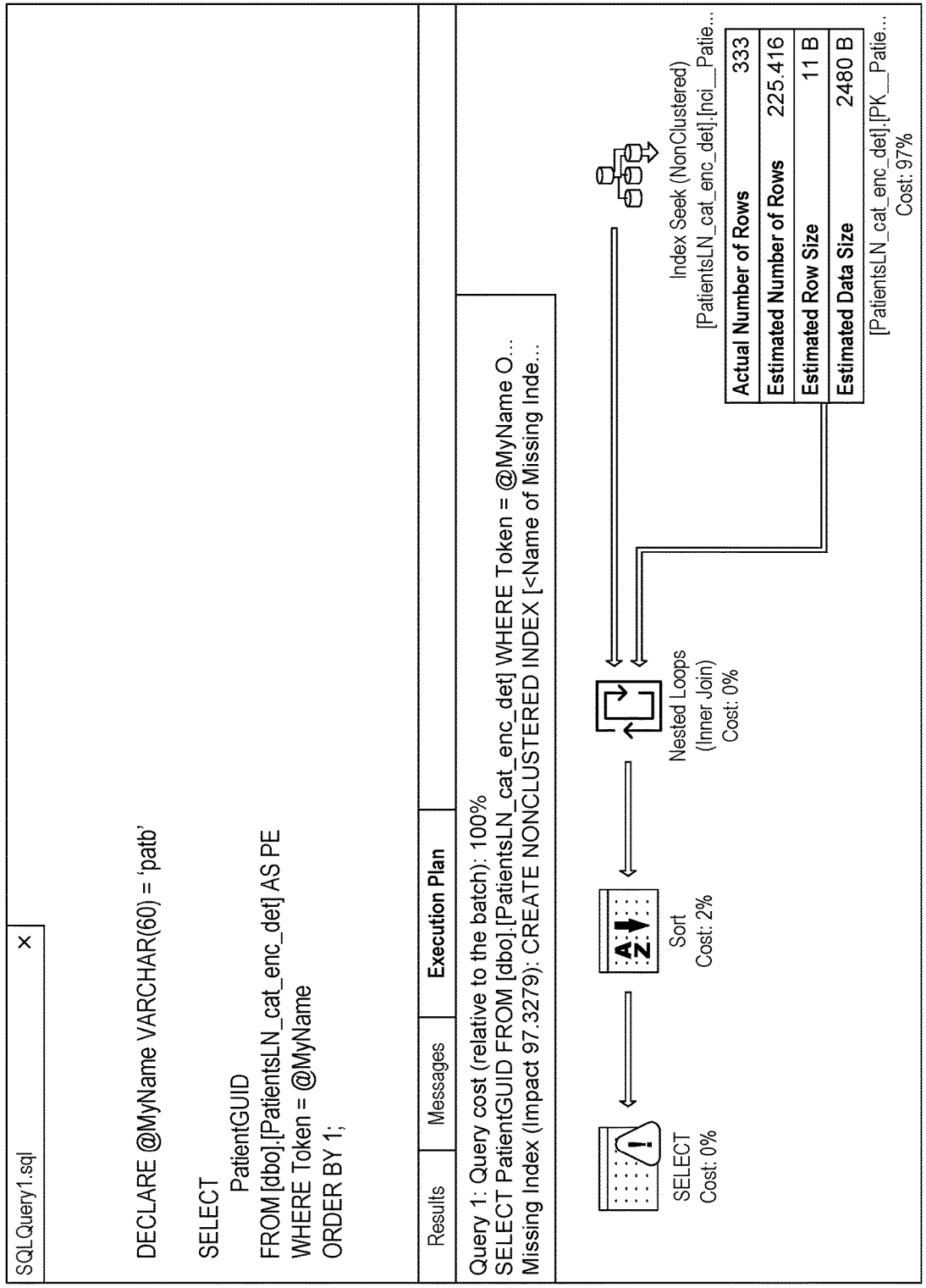
FIG. 35 illustrates the execution plan for a query utilizing a "Patients_enc_nondet" data table.

FIG. 35 illustrates the execution plan for the first query utilizing the "Patients_enc_nondet" data table. As can be seen, an index scan operation was performed to retrieve matches from the "patient_enc_nondet" table even when the use of the non-clustered index is forced in the optimizer via a WITH hint. For the query, encrypted last name values for all 1070928 unique patients have to be retrieved from the index, unencrypted, and then filtered based on the filter condition of "patb%". This first requires a very large number of input/output (I/O) operations to retrieve all the data, and then further requires a large number of central processing unit (CPU) cycles to unencrypt everything. The end result is a lot of wasted effort to process a lot of data that will not be used for the final matching.

FIG. 36 illustrates the execution plan for the second query utilizing the "PatientsLN_cat_enc_det" data table. In contrast to the execution plan for the first query, an index seek operation is utilized which resulted in a much lower number of processed values (333 vs. 1070928) and much lower data size (2.5 KB vs. 130 MB). The use of an index seek operation indicates that the second query is a much more sargable approach.

This seek operation is enabled by the use of deterministic encryption, e.g. the use of the deterministic encryption option from the Always Encrypted SQL Server feature set of Microsoft SQL Server. In the second query, the "@MyName" variable containing the 'path' search string is declared a special way in Transact-SQL (T-SQL), as illustrated in FIG. 37.

Once this is done, if the user or system has access to the encryption key, then the value of 'path' is encrypted which produces the identical encrypted (hash) value that was generated when any identical substring tokens in the table were encrypted with the same encryption key.

For example, consider a hypothetical data record in the "Patients" table having a last name value of "patben". Because the "PatientsLN_cat_enc_det" data table stores hashes for every possible length substring at the start of "patben" (e.g. "patben", "patbe", "patb", etc.), a binary search operation is now possible using the actual encrypted hash value without the need to first unencrypt it. This results in the ability for the database engine to apply sargability methods while traversing the binary tree index defined on the encrypted column and use a Seek operation instead of a Scan operation.

Although largely described herein with respect to searching for values starting with a specified string, methodologies in accordance with one or more preferred implementations are useful for improving the performance of searching data records for encrypted data values containing a search string in other contexts as well.

For example, methodologies in accordance with one or more preferred implementations are used to search data records for encrypted data values ending with a search string, or even simply containing a search string anywhere therein.

Figure 38:
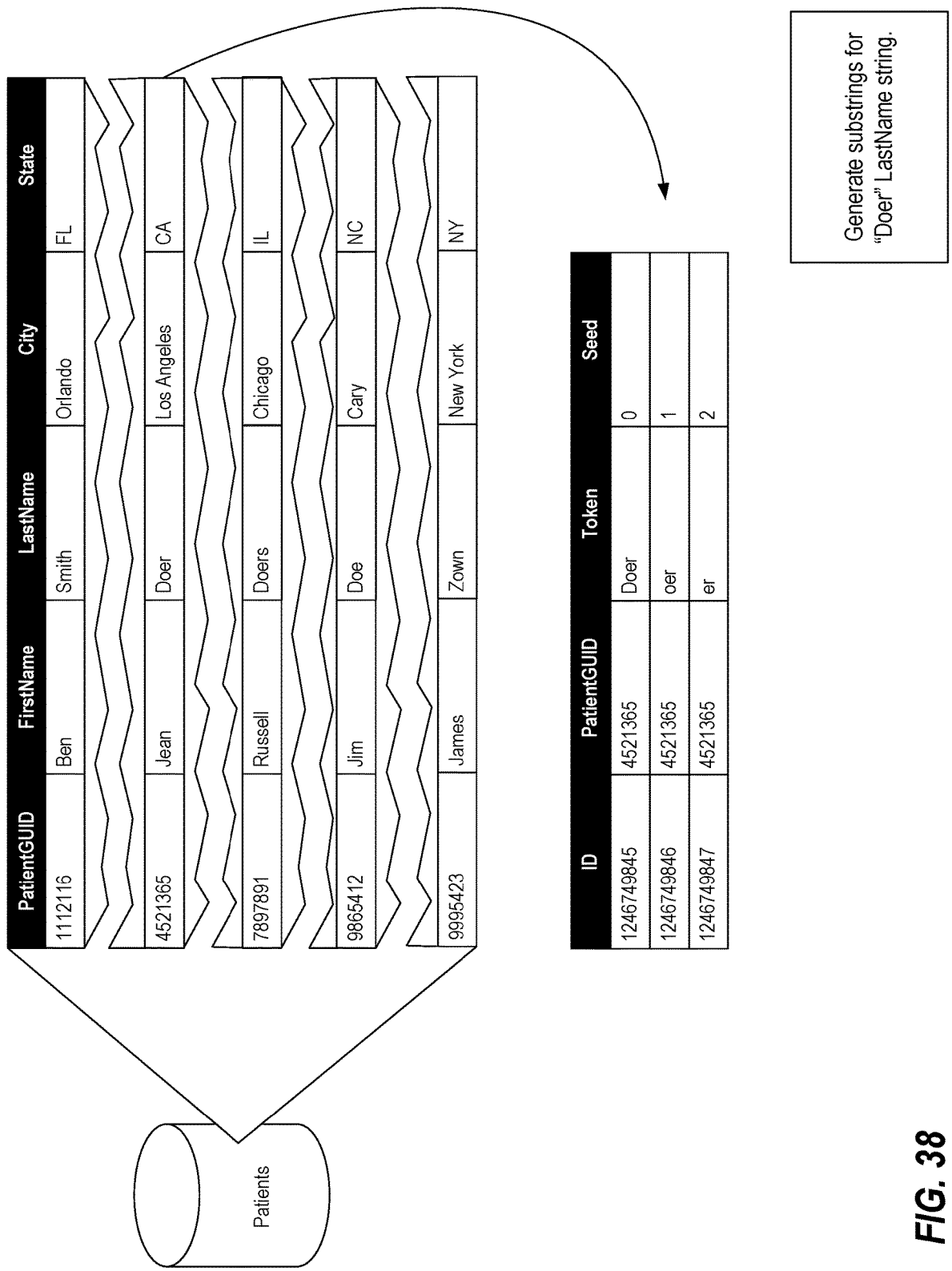
FIG. 38 illustrates the generation of substrings for use in searching for encrypted data values ending with a search string.

For example, FIG. 38 illustrates the generation of substrings for use in searching for encrypted data values ending with a search string (such as "oer"). FIG. 39 provides pseudo-code illustrating exemplary program structure that could be used in accordance with such a methodology.

Figure 40:
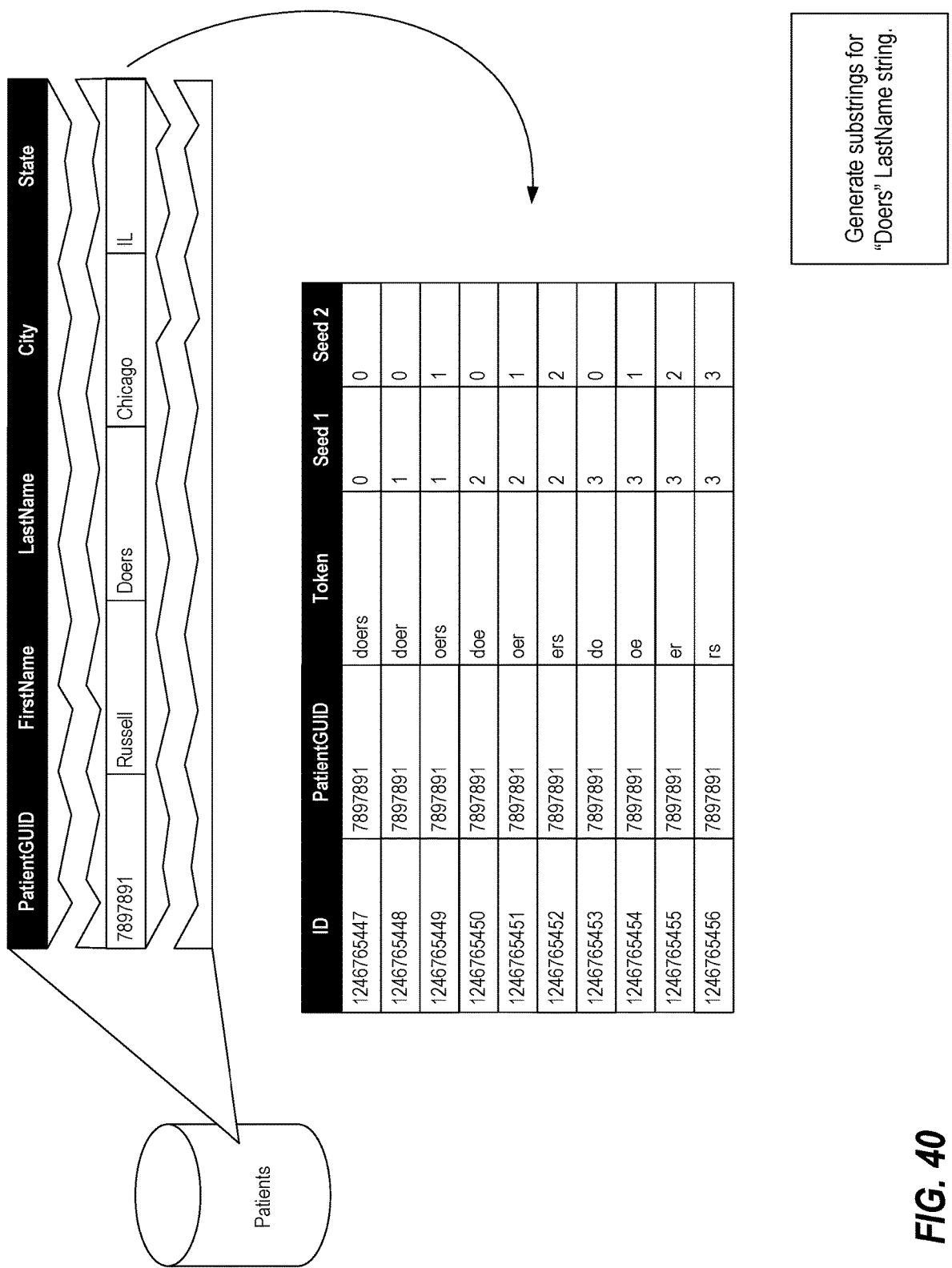
FIG. 40 illustrates the generation of substrings for use in searching for encrypted data values containing a search string anywhere therein.

FIG. 40 illustrates the generation of substrings for use in searching for encrypted data values containing a search string anywhere therein. FIG. 41 provides pseudo-code illustrating exemplary program structure that could be used in accordance with such a methodology.

It will be appreciated that although stored substrings improve efficiency for searching, it does require storage to store each generated encrypted substring token, and it does require some processing to initially generate and encrypt these substring tokens. In this regard, the more substring tokens that are generated and stored, the more storage is required. Thus, for example, storing substring tokens for substrings of various lengths at the start of a string requires less storage than storing substring tokens for substrings of the same various lengths that are found anywhere in the string. Similarly, generating and storing substring tokens for only those substrings having a length greater than two could further reduce the number of generated and stored substrings. In accordance with one or more preferred implementations, computer executable instructions allow for definition of a minimum substring length for which to generate substrings.

In accordance with one or more preferred implementations, capitalization may be removed or added to generated substrings prior to encryption to facilitate subsequent comparisons. In accordance with one or more preferred implementations, capitalization may be removed or added to a search string prior to encryption for comparison to encrypted substring tokens.

Although exemplary implementations are described herein involving generating and storing substrings to facilitate subsequent searching for a last name field or column, it will be appreciated that these are examples utilized to illustrate methodologies in accordance with one or more preferred implementations, and that substring tokens may be generated and stored for any field or column for which subsequent searching may be desired. Notably, in this regard, substring tokens may be generated for two or more different fields or columns, and stored in two or more different tables.

Based on the foregoing description, it will be readily understood by those persons skilled in the art that the present invention has broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof

What is claimed is:

1. A server computing device comprising:
a processor; and
memory that stores instructions that, when executed by the processor, cause the processor to perform acts comprising:
generating a plurality of encrypted substrings of a plaintext string by:
(a) selecting a substring of the plaintext string based upon a start position and a seed value, the selected substring comprising a plurality of sequential characters of the plaintext string starting at the start position;
(b) encrypting the selected substring;
(c) decrementing the seed value; and
(d) repeating acts (a) through (c) until the seed value reaches a threshold value;
storing, in a first data table, the plurality of encrypted substrings, wherein each of the encrypted substrings is associated with reference data that is indicative of a corresponding encrypted string in a second data table, the encrypted string being an encrypted form of the plaintext string;
responsive to receiving a search query that comprises a search string, encrypting the search string according to the deterministic encryption algorithm; and
performing a search over the first data table based upon the encrypted search string to return search results, the search results comprising at least one of the encrypted string or the plaintext string, wherein performing the search comprises:
  determining that a first encrypted sub string in the encrypted sub strings matches the encrypted search string; and
  outputting at least one of the encrypted string or the plaintext string as the search results based upon the reference data associated with the first encrypted substring.

2. The server computing device of claim 1, the acts further comprising:
  storing, in a third data table, a second plurality of encrypted sub strings, wherein each of the second plurality of encrypted sub strings is associated with second reference data that is indicative of a corresponding second encrypted string in the second data table, the second encrypted string being an encrypted form of a second plaintext string, each of the second plurality of encrypted substrings generated by encrypting a respective substring of the second plaintext string according to the deterministic encryption algorithm.

3. The server computing device of claim 2, the acts further comprising:
  responsive to receiving a second search query that comprises a second search string, encrypting the second search string according to the deterministic encryption algorithm; and
  performing a second search over the first data table and the third data table based upon the encrypted second search string to return search results, wherein performing the second search comprises:
    determining that a second encrypted sub string in the second plurality of encrypted sub strings matches the encrypted second search string; and
    outputting at least one of the second encrypted string or the second plaintext string as second search results based upon the second reference data associated with the second encrypted sub strings.

4. The server computing device of claim 3, wherein performing the second search further comprises:
  determining that a third encrypted substring in the encrypted substrings matches the encrypted second search string; and
  outputting at least one of the encrypted string or the plaintext string as part of the second search results.

5. The server computing device of claim 1, generating a second plurality of encrypted substrings by encrypting a first plurality of substrings of the plaintext string, wherein each of the first plurality of sub strings of the plaintext string has a different length and comprises a respective plurality of sequential characters in the plaintext string, wherein each of the first plurality of substrings of the plaintext string begins at a same first position in the plaintext string.

6. The server computing device of claim 5, generating a third plurality of encrypted substrings by encrypting a second plurality of substrings of the plaintext string, wherein each of the second plurality of substrings of the plaintext string has a different length and comprises a respective plurality of sequential characters in the plaintext string, wherein each of the second plurality of substrings of the plaintext string begins at a same second position in the plaintext string.

7. The server computing device of claim 1, wherein the encrypted string is encrypted using a different encryption algorithm from the deterministic encryption algorithm.

8. The server computing device of claim 1, wherein the encrypted string is encrypted using the deterministic encryption algorithm.

9. The server computing device of claim 1, wherein outputting the at least one of the encrypted string or the plaintext string as search results comprises:
  retrieving the encrypted string responsive to determining that the first encrypted sub string in the encrypted substrings matches the encrypted search string;
  decrypting the encrypted string to recover the plaintext string; and
  outputting the plaintext string as search results.

10. A method for searching an encrypted database comprising:
  responsive to receipt of a plaintext string that is to be stored in a first entry in a first data table in the encrypted database, generating a plurality of encrypted substrings, wherein generating the plurality of encrypted substrings comprises:
    (a) selecting a substring of the plaintext string based upon a start position and a seed value, the selected sub string comprising a plurality of sequential characters of the plaintext string starting at the start position;
    (b) encrypting the selected substring according to the deterministic encryption algorithm;
    (c) performing one of decrementing or incrementing the seed value; and
    (d) repeating acts (a) through (c) until the seed value reaches a threshold value to generate the plurality of encrypted substrings;
  storing, in a second data table, the plurality of encrypted substrings, wherein each of the encrypted substrings is associated with reference data that is indicative of the first entry in the first data table, wherein the first entry comprises an encrypted string that is an encrypted form of the plaintext string;
  responsive to receiving a search query that comprises a search string, encrypting the search string according to the deterministic encryption algorithm; and
  performing a search over the second data table based upon the encrypted search string to return search results, the search results comprising at least one of the encrypted string or the plaintext string, wherein performing the search comprises:
    determining that a first encrypted substring in the encrypted substrings matches the encrypted search string; and
    outputting at least one of the encrypted string or the plaintext string as the search results based upon the reference data associated with the first encrypted substring.

11. The method of claim 10, wherein the second data table is sorted according to values of the encrypted substrings.

12. The method of claim 11, wherein determining that the first encrypted substring matches the encrypted search string is based upon a binary search algorithm.

13. The method of claim 11, wherein determining that the first encrypted substring matches the encrypted search string is based upon execution of a SQL query with respect to the second data table.

14. The method of claim 10, wherein the first data table comprises protected health information pertaining to a plurality of patients.

15. The method of claim 10, wherein the search query is received from an electronic health records application (EHR).

16. A non-transitory computer-readable storage medium that stores instructions that, when executed by a processor, cause the processor to perform acts comprising:

responsive to receipt of a plaintext string, storing an encrypted string that is an encrypted form of the plaintext string in a first entry in a first data table;

generating a plurality of encrypted substrings of the plaintext string by:
(a) selecting a substring of the plaintext string based upon a start position and a seed value, the selected substring comprising a plurality of sequential characters of the plaintext string starting at the start position;
(b) encrypting the selected substring;
(c) decrementing the seed value; and
(d) repeating acts (a) through (c) until the seed value reaches a threshold value to generate the plurality of encrypted substrings storing, in a second data table, the plurality of encrypted substrings, wherein each of the encrypted substrings is associated with reference data that is indicative of the first entry in the first data table;

responsive to receiving a search query that comprises a search string, encrypting the search string according to the deterministic encryption algorithm; and performing a search over the second data table based upon the encrypted search string to return search results, the search results comprising at least one of the encrypted string or the plaintext string, wherein performing the search comprises:

determining that a first encrypted substring in the encrypted substrings matches the encrypted search string; and outputting at least one of the encrypted string or the plaintext string as the search results based upon the reference data associated with the first entry in the first data table.

* * * * *